US009163686B2

(12) United States Patent
Kawai et al.

(10) Patent No.: US 9,163,686 B2
(45) Date of Patent: Oct. 20, 2015

(54) CLUTCH UNIT

(75) Inventors: Masahiro Kawai, Iwata (JP); Kouji Isoda, Iwata (JP); Naotsugu Kitayama, Iwata (JP)

(73) Assignee: NTN CORPORATION, Osaka (JP)

( * ) Notice: Subject to any disclaimer, the term of this patent is extended or adjusted under 35 U.S.C. 154(b) by 105 days.

(21) Appl. No.: 13/985,306

(22) PCT Filed: Feb. 9, 2012

(86) PCT No.: PCT/JP2012/053002
§ 371 (c)(1),
(2), (4) Date: Aug. 14, 2013

(87) PCT Pub. No.: WO2012/120961
PCT Pub. Date: Sep. 13, 2012

(65) Prior Publication Data
US 2013/0327609 A1 Dec. 12, 2013

(30) Foreign Application Priority Data
Mar. 9, 2011 (JP) .................................. 2011-051746

(51) Int. Cl.
*F16D 67/02* (2006.01)
*F16D 41/10* (2006.01)
*B60N 2/16* (2006.01)
*F16D 41/08* (2006.01)
*F16D 41/06* (2006.01)

(52) U.S. Cl.
CPC ................ *F16D 67/02* (2013.01); *B60N 2/167* (2013.01); *B60N 2/168* (2013.01); *F16D 41/088* (2013.01); *F16D 41/105* (2013.01); *F16D 2041/0605* (2013.01)

(58) Field of Classification Search
CPC .......... F16D 2041/0605; F16D 41/105; B60N 2/167; B60N 2/168
See application file for complete search history.

(56) References Cited

U.S. PATENT DOCUMENTS

2009/0272613 A1* 11/2009 Kawai et al. ..................... 192/45
2010/0175962 A1* 7/2010 Kawai et al. ..................... 192/16
2010/0224461 A1 9/2010 Kawai
2012/0305359 A1* 12/2012 Sato et al. ................ 192/45.001

FOREIGN PATENT DOCUMENTS

| CN | 101427041 | 5/2009 |
|---|---|---|
| EP | 2 003 358 | 12/2008 |
| JP | 2006-038207 | 2/2006 |
| JP | 2007-270998 | 10/2007 |
| JP | 2008-075777 | 4/2008 |

(Continued)

OTHER PUBLICATIONS

International Search Report mailed Apr. 24, 2012 in International (PCT) Application No. PCT/JP2012/053002.

(Continued)

*Primary Examiner* — Richard Lorence
(74) *Attorney, Agent, or Firm* — Wenderoth, Lind & Ponack, L.L.P.

(57) ABSTRACT

A brake-side clutch section on an output side transmits rotational torque input from a lever-side clutch section on an input side, for controlling transmission and interruption of the rotational torque to the output side through lever operation, to the output side, and interrupts rotational torque reversely input from the output side.

14 Claims, 30 Drawing Sheets

(56) References Cited

FOREIGN PATENT DOCUMENTS

| JP | 2009-030634 | 2/2009 |
| JP | 2009-210119 | 9/2009 |
| JP | 2010-19343 | 1/2010 |
| JP | 2010-025206 | 2/2010 |
| JP | 2010-242802 | 10/2010 |
| JP | 2010-242847 | 10/2010 |
| WO | WO 2011/114878 A1 * | 9/2011 |

OTHER PUBLICATIONS

International Preliminary Report on Patentability and Written Opinion of the International Searching Authority mailed Sep. 19, 2013 in International (PCT) Application No. PCT/JP2012/053002.

Office Action issued May 14, 2015 in corresponding Chinese Patent Application No. 201280011711.8 with partial English translation.

* cited by examiner

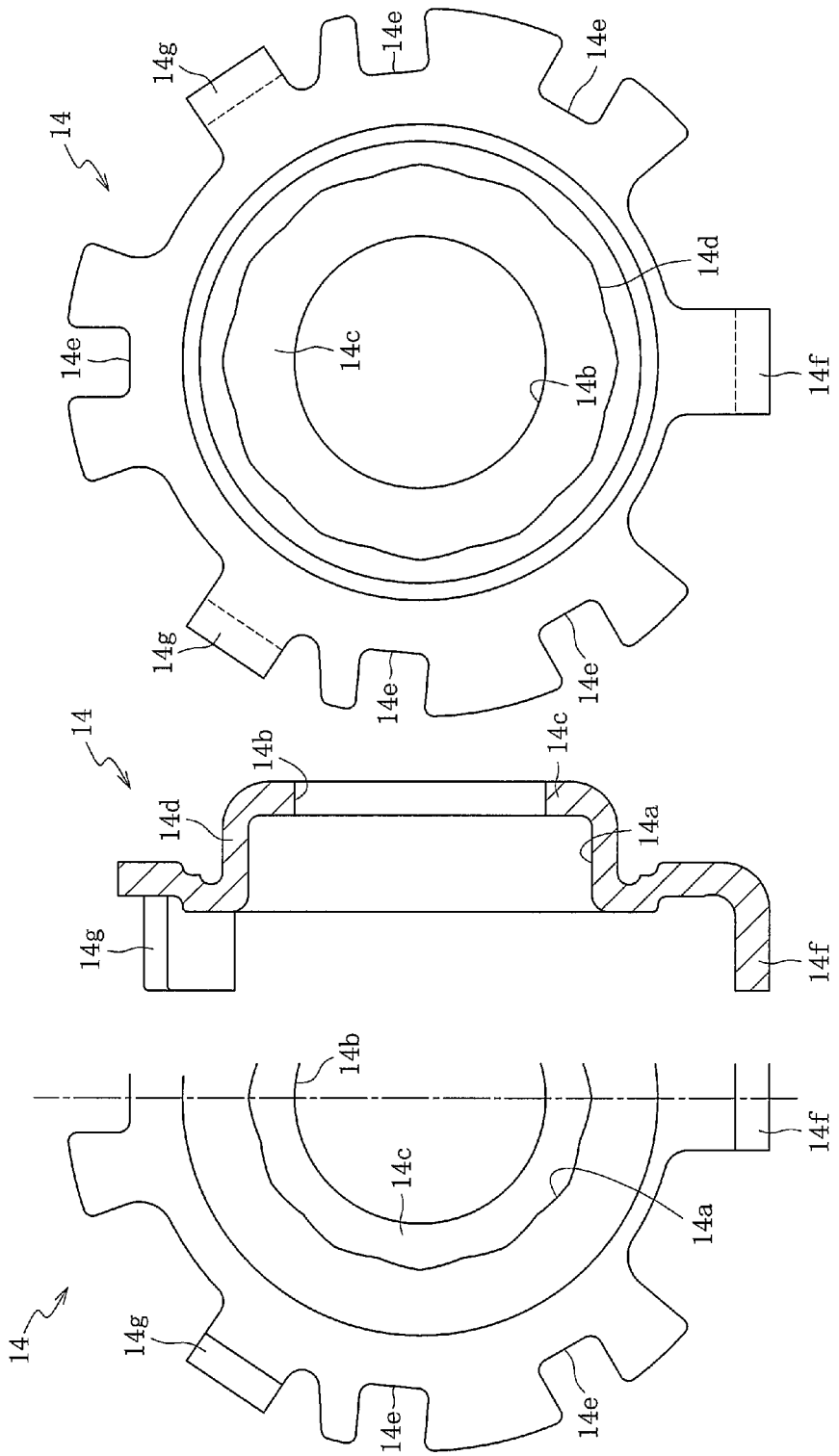

Fig. 17a
Fig. 17b
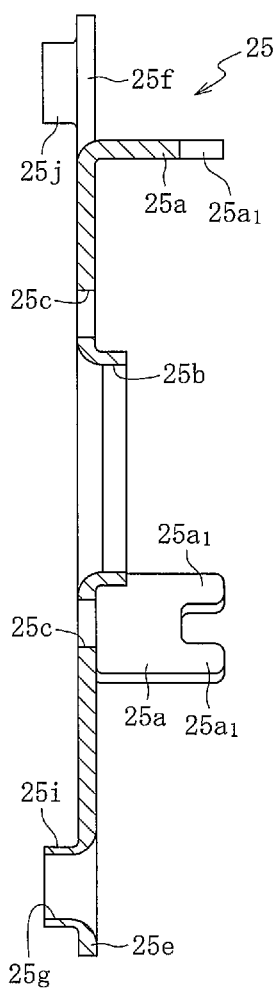
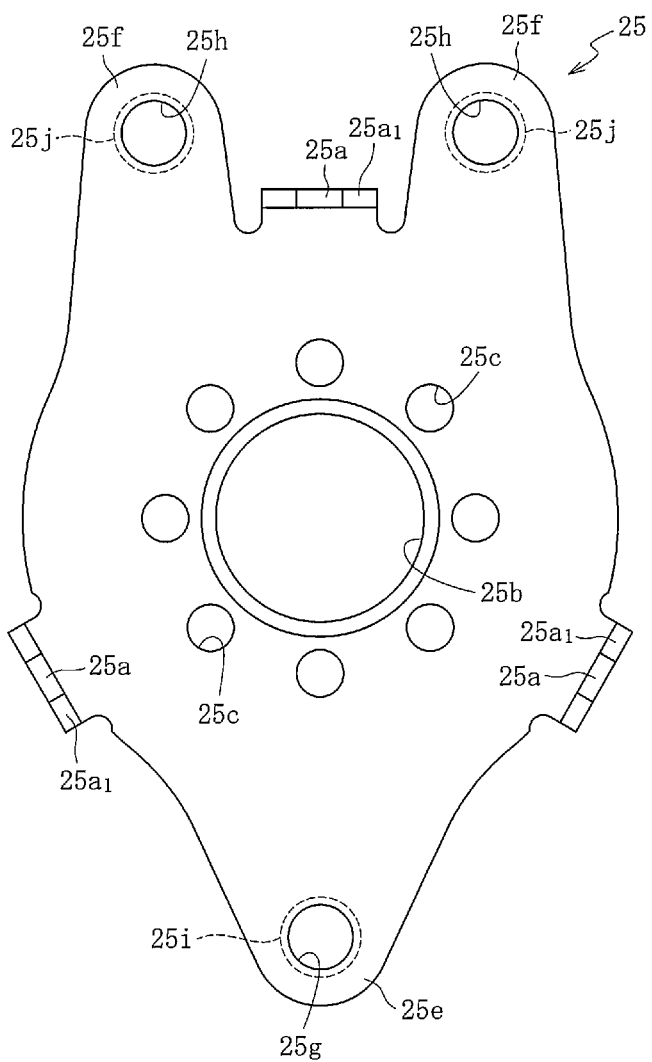

CLUTCH UNIT

TECHNICAL FIELD

The present invention relates to a clutch unit having a lever-side clutch section for transmitting rotational torque from an input side to an output side thereof and a brake-side clutch section for transmitting rotational torque from the input side to the output side and interrupting rotational torque reversely input from the output side.

BACKGROUND ART

In general, in a clutch unit using engagement elements such as cylindrical rollers or balls, a clutch section is arranged between an input-side member and an output-side member. Further, in the clutch section, the engagement elements such as cylindrical rollers or balls are engaged and disengaged with respect to wedge gaps formed between the input-side member and the output-side member, thereby controlling transmission and interruption of the input torque.

The applicant of the present invention has previously proposed a clutch unit incorporated into, for example, an automobile seat-lifter section that vertically adjusts a seat through lever operation. This clutch unit includes a lever-side clutch section for transmitting rotational torque from the input side to the output side and a brake-side clutch section for transmitting rotational torque from the input side to the output side and interrupting rotational torque reversely input from the output side (see, for example, Patent Literature 1).

FIG. 31 is a longitudinal sectional view of an overall structure of the conventional clutch unit disclosed in Patent Literature 1, FIG. 32 is a sectional view taken along the line D-D of FIG. 31, and FIG. 33 is a sectional view taken along the line E-E of FIG. 31.

As illustrated in FIGS. 31 and 32, a lever-side clutch section 111 mainly includes a lever-side outer ring 114 serving as an input-side member to which rotational torque is input through lever operation, an inner ring 115 serving as a coupling member for transmitting the rotational torque from the lever-side outer ring 114 to a brake-side clutch section 112, a plurality of cylindrical rollers 116 serving as engagement elements for controlling transmission and interruption of the rotational torque input from the lever-side outer ring 114 through engagement and disengagement between the lever-side outer ring 114 and the inner ring 115, a cage 117 for retaining the cylindrical rollers 116 at predetermined circumferential intervals, a brake-side outer ring 123 serving as a stationary-side member restricted in rotation, an inner centering spring 118 serving as a first elastic member that is provided between the cage 117 and the brake-side outer ring 123, for accumulating an elastic force obtained by the rotational torque input from the lever-side outer ring 114 and restoring the cage 117 to a neutral state with the accumulated elastic force through releasing of the input torque, and an outer centering spring 119 serving as a second elastic member that is provided between the lever-side outer ring 114 and the brake-side outer ring 123, for accumulating an elastic force obtained by the rotational torque input from the lever-side outer ring 114 and restoring the lever-side outer ring 114 to the neutral state with the accumulated elastic force through releasing of the input torque.

Note that, in the figures, reference symbol 113 represents a lever-side side plate fixed to the lever-side outer ring 114 by swaging and constituting the input-side member together with the lever-side outer ring 114, and reference symbol 131 represents a washer mounted to an output shaft 122 through intermediation of a wave washer 130. An operation lever (not shown) is mounted to the lever-side side plate 113.

Meanwhile, as illustrated in FIGS. 31 and 33, the brake-side clutch section 112 mainly includes the inner ring 115 serving as a coupling member to which rotational torque from the lever-side clutch section 111 is input, the brake-side outer ring 123 serving as a stationary-side member restricted in rotation, the output shaft 122 serving as the output-side member from which the rotational torque is to be output, a plurality of pairs of cylindrical rollers 127 serving as engagement elements arranged in wedge gaps 126 between the brake-side outer ring 123 and the output shaft 122, for controlling transmission of rotational torque input from the inner ring 115 and interruption of rotational torque reversely input from the output shaft 122 through engagement and disengagement between the brake-side outer ring 123 and the output shaft 122, and plate springs 128 each inserted between the cylindrical rollers 127 of each pair, for imparting a repulsive force to the cylindrical rollers 127.

A larger diameter portion 115c extending from an axial end portion of the inner ring 115 in a radially outer direction and bending in an axial direction functions as a cage for retaining the cylindrical rollers 127 at predetermined circumferential intervals. In the figures, reference symbols 124 and 125 respectively represent a cover and a brake-side side plate constituting the stationary-side member together with the brake-side outer ring 123, and the brake-side outer ring 123 and the cover 124 are integrally fixed to each other with the brake-side side plate 125 by swaging. Reference symbol 129 represents a friction ring serving as a braking member mounted to the brake-side side plate 125.

CITATION LIST

Patent Literature 1: JP 2009-30634 A

Technical Problems

By the way, as described above, the brake-side clutch section 112 of the conventional clutch unit disclosed in Patent Literature 1 includes the plurality of pairs of cylindrical rollers 127 arranged in the wedge gaps 126 formed between the brake-side outer ring 123 and the output shaft 122, for controlling the transmission of the input torque and the interruption of the reversely input torque through the engagement and disengagement between the brake-side outer ring 123 and the output shaft 122, and the plate springs 128 each inserted between the cylindrical rollers 127 of each pair, for imparting a repulsive force to the cylindrical rollers 127. The plate spring 128 that is one of the components of the brake-side clutch section 112 has an N-shape in cross section (see FIG. 33).

At the time of actuation of the brake-side clutch section 112 through the lever operation, as indicated by the arrow in FIG. 34, the larger diameter portion 115c of the inner ring 115, which functions as the cage, abuts on one of the cylindrical rollers 127 and presses the cylindrical rollers 127 against the elastic force of the plate spring 128. Thus, the cylindrical rollers 127 are disengaged from the wedge gaps 126 so as to release a locked state of the output shaft 122.

At this time, the plate spring 128 pressed by the cylindrical rollers 127 is easily subjected to a moment load under a state in which the cylindrical rollers 127 are located close to each other. Therefore, as illustrated in FIG. 35, the plate spring 128 is liable to be brought into a state of being caught in the wedge gap 126 formed between the brake-side outer ring 123 and the output shaft 122, and a frictional force (see the arrow in FIG.

35) is generated between the brake-side outer ring 123 and the plate spring 128. Consequently, as illustrated in FIG. 36, the plate spring 128 may fall down between the cylindrical rollers 127 due to the frictional force. When the plate spring 128 thus falls down between the cylindrical rollers 127, there arises a trouble in that the cylindrical rollers 127 are hard to engage with the wedge gap 126.

Even in a case where the plate spring 128 does not fall down under the above-mentioned situation, when the plate spring 128 is brought into the state of being caught in the wedge gap 126 formed between the brake-side outer ring 123 and the output shaft 122, the plate spring 128 is kept in this state and hard to restore to the initial state thereof, thus leading to a risk in that satisfactory actuation performance cannot be secured. In a case where the thickness of the plate spring 128 is reduced so that the plate spring 128 is not easily snapped due to a stress, the plate spring 128 is liable to be brought into the caught state more remarkably.

SUMMARY OF INVENTION

The present invention has been proposed in view of the problems described above, and it is therefore an object thereof to provide a clutch unit capable of preventing in advance a plate spring from being caught in a wedge gap at the time of actuation of a brake-side clutch section through lever operation.

Solution to Problems

A clutch unit according to the present invention comprises: a lever-side clutch section provided on an input side, for controlling transmission and interruption of rotational torque to an output side through lever operation; and a brake-side clutch section provided on the output side, for transmitting the rotational torque input from the lever-side clutch section to the output side, and for interrupting rotational torque reversely input from the output side.

The brake-side clutch section of the clutch unit according to the present invention comprises: a stationary-side member restricted in rotation; an output-side member from which the rotational torque is to be output; a plurality of pairs of engagement elements arranged in wedge gaps formed between the stationary-side member and the output-side member, for controlling the transmission of the input rotational torque and the interruption of the reversely input rotational torque through engagement and disengagement between the stationary-side member and the output-side member; and plate springs each inserted between each of the plurality of pairs of engagement elements, for imparting a repulsive force to the each of the plurality of pairs of engagement elements. Each of the plate springs has an N-shape in cross section that comprises an intermediate oblique portion and upright portions formed by folding both ends of the intermediate oblique portion and extending both the ends in opposite directions. An outside dimension between both the ends of the intermediate oblique portion is set smaller than a maximum gap dimension of each of the wedge gaps formed between the stationary-side member and the output-side member. Note that, it is desired that the each of the plurality of pairs of engagement elements of the brake-side clutch section comprise a cylindrical roller.

In the present invention, in the each of the plate springs having the N-shape in cross section, for imparting the repulsive force to the engagement elements, the outside dimension between both the ends of the intermediate oblique portion is set smaller than the maximum gap dimension of the each of the wedge gaps formed between the stationary-side member and the output-side member, and thus, at the time of actuation of the brake-side clutch section through the lever operation, a gap is formed between the stationary-side member and the intermediate oblique portion of the plate spring that is pressed and deformed by the engagement elements or between the output-side member and the intermediate oblique portion. Thus, the plate spring is not subjected to the moment load under the state in which the engagement elements are located close to each other, and hence it is possible to avoid such a situation that the intermediate oblique portion of the plate spring is brought into the state of being caught in the wedge gap formed between the stationary-side member and the output-side member. As a result, the plate spring does not even fall down. In this manner, the plate spring is easily restored to the initial state so that satisfactory actuation performance can be secured.

In the present invention, it is desired that a length dimension of each of the upright portions of the each of the plate springs be set at least ¾ of a radius of the each of the plurality of pairs of engagement elements. With this structure, at the time of actuation of the brake-side clutch section through the lever operation, it is possible to avoid such a situation that the upright portion of the plate spring that is pressed and deformed by the engagement elements enters a gap formed between the stationary-side member and the engagement element or between the output-side member and the engagement element, and hence the plate spring can be prevented in advance from falling down. Note that, when the length dimension of the upright portion is smaller than ¾ of the radius of the engagement element, the length dimension of the upright portion cannot be secured sufficiently, and at the time of actuation of the brake-side clutch section through the lever operation, the upright portion of the plate spring that is pressed and deformed by the engagement elements easily enters the gap formed between the stationary-side member and the engagement element or between the output-side member and the engagement element.

In the present invention, it is desired that the length dimension of the each of the upright portions of the each of the plate springs be set larger than a separation dimension between both the ends of the intermediate oblique portion, which is a dimension determined in parallel to the each of the upright portions. With this structure, at the time of actuation of the brake-side clutch section through the lever operation, it is possible to avoid such a situation that the upright portion of the plate spring that is pressed and deformed by the engagement elements enters the gap formed between the stationary-side member and the engagement element or between the output-side member and the engagement element, and hence the plate spring can be prevented in advance from falling down. Note that, when the length dimension of the upright portion is smaller than the separation dimension between both the ends of the intermediate oblique portion, which is the dimension determined in parallel to the upright portion, the length dimension of the upright portion cannot be secured sufficiently, and at the time of actuation of the brake-side clutch section through the lever operation, the upright portion of the plate spring that is pressed and deformed by the engagement elements easily enters the gap formed between the stationary-side member and the engagement element or between the output-side member and the engagement element.

Further, in the present invention, it is desired that the each of the plate springs comprise folding portions having a round shape in cross section, the folding portions being formed between the intermediate oblique portion and the upright portions, and that one of the folding portions be different in size from another of the folding portions. With this structure, in a case where a plurality of the plate springs are brought into a state of being stacked one on top of another so as to handle the plate springs at the time of transportation thereof, the folding portions positioned in the vertical direction do not fit each other. As a result, it is possible to avoid such a situation that the plate springs are brought into a close contact state, and to facilitate work of separating the plate springs when assembling the each of the plate springs to the brake-side clutch section.

In the present invention, it is desired that the each of the plate springs comprise bending portions for connecting the intermediate oblique portion to the respective folding portions, and that one of the bending portions is different in curvature radius from another of the bending portions. With this structure, in the case where a plurality of the plate springs are brought into a state of being stacked one on top of another so as to handle the plate springs at the time of transportation thereof, gaps are formed in the vicinity of the bending portions positioned in the vertical direction. As a result, it is possible to avoid such a situation that the plate springs are brought into a close contact state, and to facilitate the work of separating the plate springs when assembling the each of the plate springs to the brake-side clutch section.

In the present invention, the lever-side clutch section may comprise: an input-side member to which the rotational torque is to be input through the lever operation; a coupling member for transmitting the rotational torque from the input-side member to the brake-side clutch section; a plurality of engagement elements for controlling the transmission and the interruption of the rotational torque input from the input-side member through engagement and disengagement between the input-side member and the coupling member; a cage for retaining each of the plurality of engagement elements at predetermined circumferential intervals; a stationary-side member restricted in rotation; a first elastic member provided between the cage and the stationary-side member, for accumulating an elastic force due to the rotational torque input from the input-side member, and for restoring the cage to a neutral state due to the accumulated elastic force by releasing the input rotational torque; and a second elastic member provided between the input-side member and the stationary-side member, for accumulating an elastic force due to the rotational torque input from the input-side member, and for restoring the input-side member to a neutral state due to the accumulated elastic force by releasing the input rotational torque. Note that, it is desired that the each of the plurality of pairs of engagement elements of the brake-side clutch section comprise a cylindrical roller.

In the clutch unit according to the present invention, the lever-side clutch section and the brake-side clutch section are incorporated in an automobile seat-lifter section. Thus, the clutch unit is suited for use in an automobile. In this case, the clutch unit has a configuration in which the input-side member is connected to an operation lever and the output-side member is coupled to a link mechanism of the automobile seat-lifter section.

Advantageous Effects of Invention

According to the present invention, in the each of the plate springs having the N-shape in cross section, for imparting the repulsive force to the engagement elements, the outside dimension between both the ends of the intermediate oblique portion is set smaller than the maximum gap dimension of the each of the wedge gaps formed between the stationary-side member and the output-side member, and thus, at the time of actuation of the brake-side clutch section through the lever operation, the gap is formed between the stationary-side member and the intermediate oblique portion of the plate spring that is pressed and deformed by the engagement elements or between the output-side member and the intermediate oblique portion. Thus, the plate spring is not subjected to the moment load under the state in which the engagement elements are located close to each other, and hence it is possible to avoid such a situation that the intermediate oblique portion of the plate spring is brought into the state of being caught in the wedge gap formed between the stationary-side member and the output-side member. Thus, the plate spring is easily restored to the initial state so that satisfactory actuation performance can be secured. As a result, it is possible to provide a highly reliable clutch unit capable of stabilizing the posture of the plate springs.

BRIEF DESCRIPTION OF DRAWINGS

FIG. 6b is a left-hand side view of FIG. 6a.
FIG. 7a is a sectional view illustrating a lever-side outer ring.
FIG. 7b is a left-hand side view of FIG. 7a.
FIG. 7c is a right-hand side view of FIG. 7a.
FIG. 8b is a left-hand side view of FIG. 8a.
FIG. 10b is a left-hand side view of FIG. 10a.
FIG. 10c is a sectional view of FIG. 10a.
FIG. 14b is a left-hand side view of FIG. 14a.
FIG. 14c is a right-hand side view of FIG. 14a.
FIG. 15b is a left-hand side view of FIG. 15a.
FIG. 16b is a right-hand side view of FIG. 16a.
FIG. 17a is a sectional view illustrating a brake-side side plate.
FIG. 17b is a right-hand side view of FIG. 17a.
FIG. 18b is a left-hand side view of FIG. 18a.
FIG. 18c is a right-hand side view of FIG. 18a.

FIG. 30b is an enlarged main part view of FIG. 30a.

DESCRIPTION OF EMBODIMENT

A clutch unit according to an embodiment of the present invention is described below in detail with reference to FIGS. 1 to 30a and 30b.

A clutch unit X is incorporated into an automobile seat-lifter section (see FIGS. 29, 30a, and 30b) for adjusting a height of a seat through lever operation or the like. As illustrated in FIGS. 1 to 5, the clutch unit X comprises a unit of a lever-side clutch section 11 provided on an input side and a brake-side clutch section 12 which is provided on an output side and which has a function of interrupting reverse input.

Figure 1:
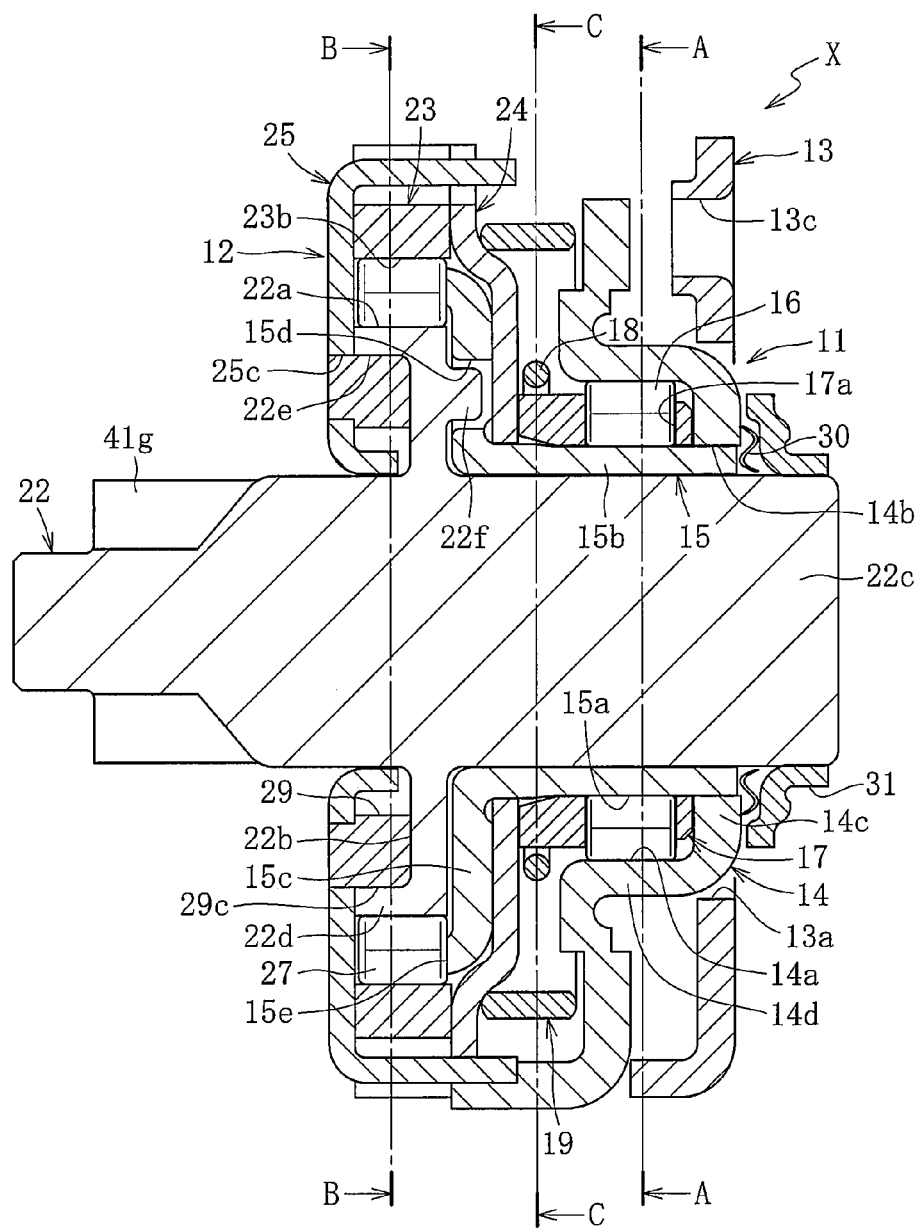
FIG. 1 is a longitudinal sectional view illustrating an overall structure of a clutch unit according to an embodiment of the present invention.
Figure 2:
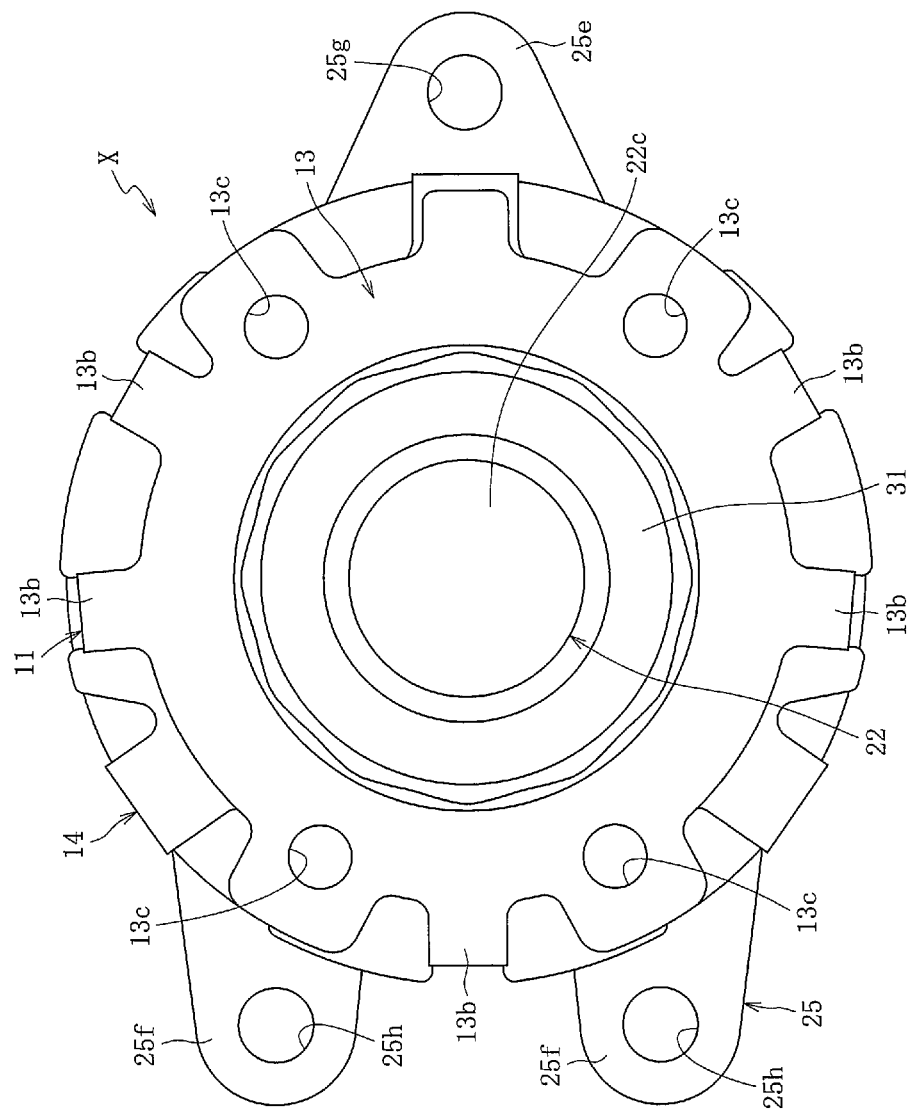
FIG. 2 is a right-hand side view of FIG. 1.
Figure 4:
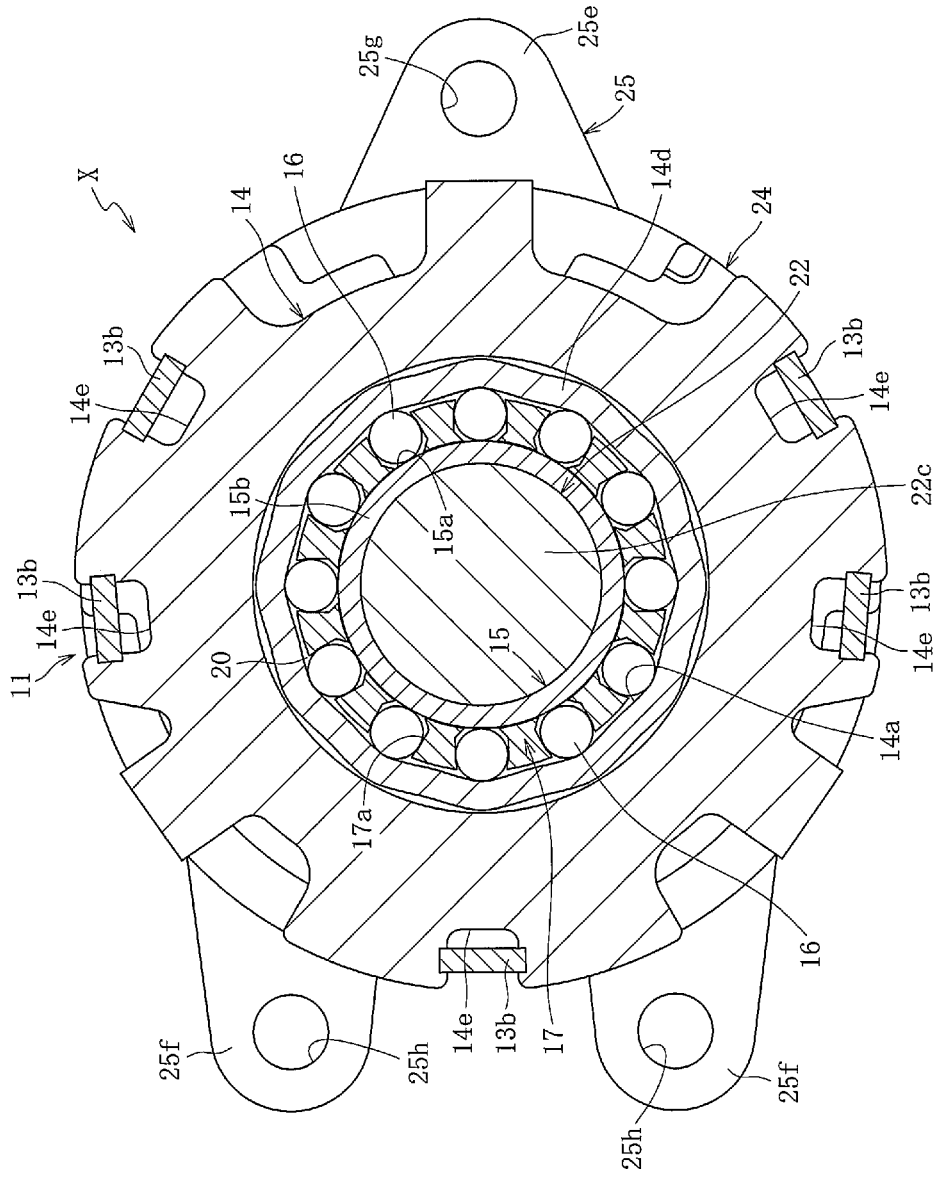
FIG. 4 is a sectional view taken along the line A-A of FIG. 1.

As illustrated in FIGS. 1, 2, and 4, the lever-side clutch section 11 comprises a lever-side side plate 13 and a lever-side outer ring 14 each serving as an input-side member to which an operation lever (not shown) or the like is coupled, an inner ring 15 serving as a coupling member that transmits rotational torque from the lever-side outer ring 14 to the brake-side clutch section 12, a plurality of cylindrical rollers 16 arranged as an example of engagement elements in wedge gaps 20 formed between an outer peripheral surface 15a of the inner ring 15 and an inner peripheral surface 14a of the lever-side outer ring 14, a cage 17 for retaining the cylindrical rollers 16 equiangularly, an inner centering spring 18 as a first elastic member for restoring the cage 17 to a neutral state, and an outer centering spring 19 as a second elastic member for restoring the lever-side outer ring 14 to a neutral state. Note that, components are prevented from being detached by press-fitting a washer 31 onto an end portion of an output shaft 22 described later through intermediation of a wave washer 30 (see FIG. 1).

Figure 3:
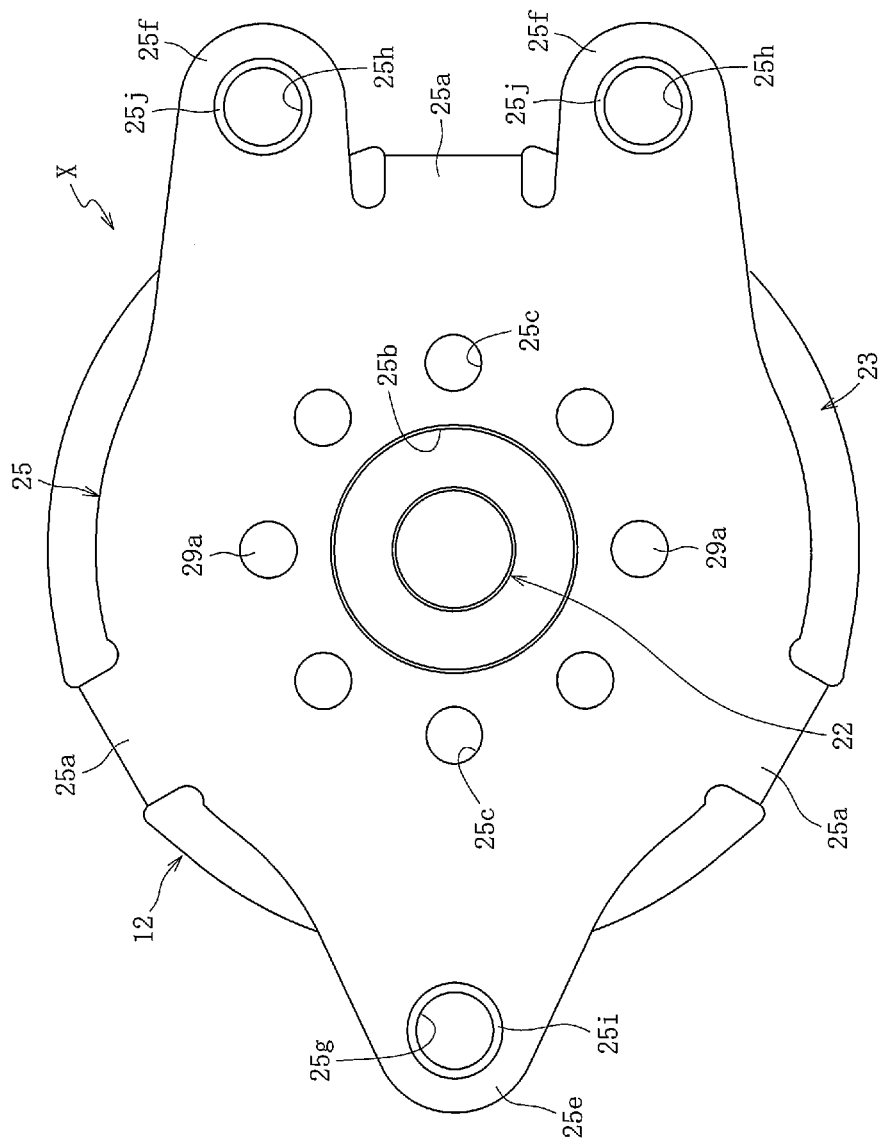
FIG. 3 is a left-hand side view of FIG. 1.
Figure 5:
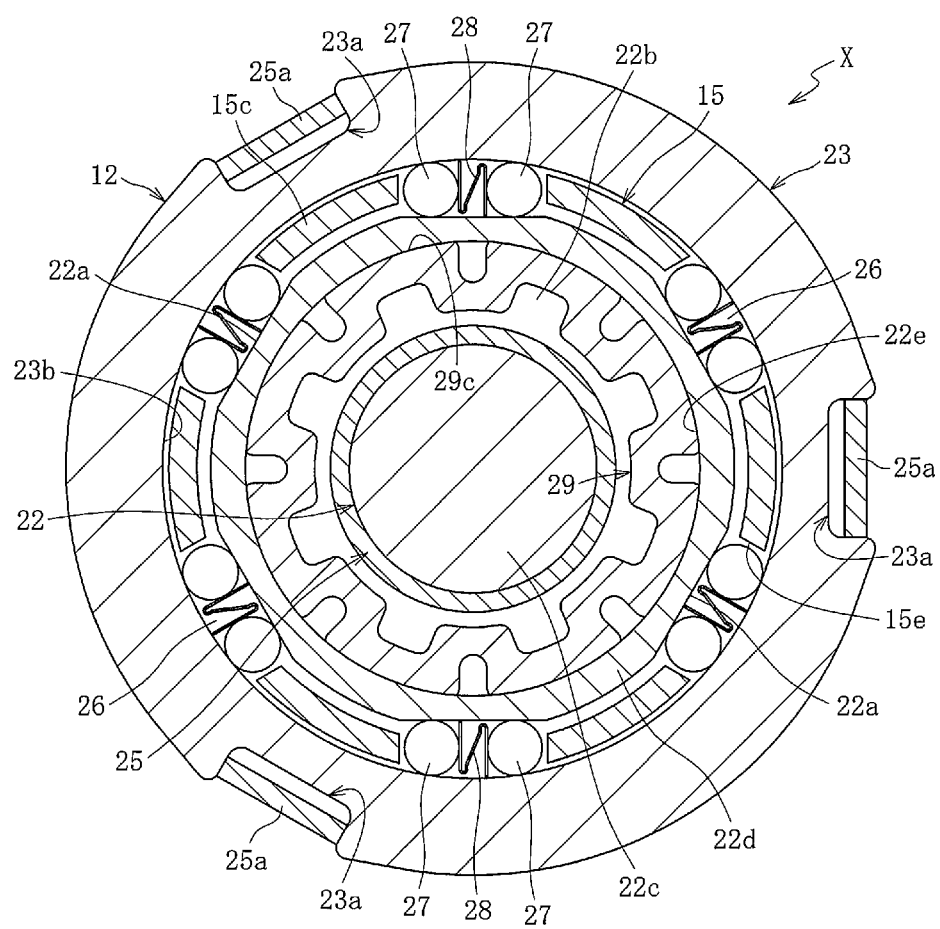
FIG. 5 is a sectional view taken along the line B-B of FIG. 1.

As illustrated in FIGS. 1, 3, and 5, the so-called lock type brake-side clutch section 12 which has a function of interrupting reverse input mainly comprises the inner ring 15 serving as a coupling member to which the rotational torque from the lever-side clutch section 11 is input, the output shaft 22 serving as an output-side member, a brake-side outer ring 23, a cover 24, and a brake-side side plate 25 each serving as a stationary-side member restricted in rotation, a plurality of pairs of cylindrical rollers 27 arranged as engagement elements in wedge gaps 26 between the brake-side outer ring 23 and the output shaft 22, for controlling transmission of the rotational torque input from the inner ring 15 and interruption of the rotational torque reversely input from the output shaft 22 through engagement and disengagement between both the members, and plate springs 28 each have an N-shape in cross section, each inserted between the cylindrical rollers 27 of each pair for imparting repulsive force to the cylindrical rollers 27. Note that, protrusions 22f are provided to the output shaft 22 and inserted into holes 15d with clearances, which are provided to the inner ring 15 (see FIG. 1).

Next, detailed description is made of main components of the lever-side clutch section 11 and the brake-side clutch section 12 which are provided in the clutch unit X.

Figure 6A:
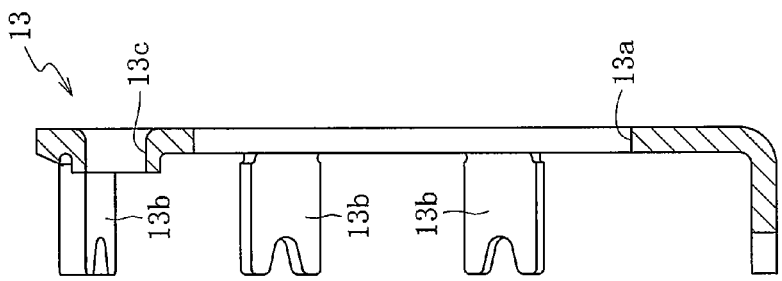
FIG. 6a is a sectional view illustrating a lever-side side plate.
Figure 6B:
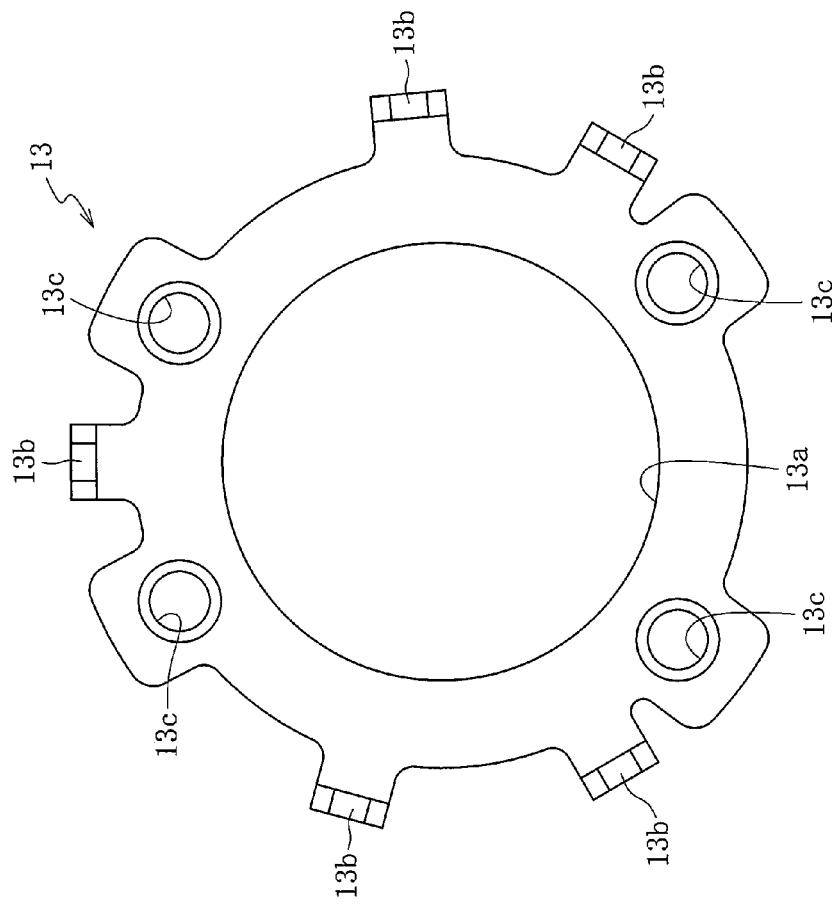

FIGS. 6a and 6b illustrate the lever-side side plate 13 of the lever-side clutch section 11. In the lever-side side plate 13, a hole 13a into which the output shaft 22 and the inner ring 15 are inserted is formed in a center portion thereof, and a plurality of (five, for example) claw portions 13b are provided in a protruding manner on an outer peripheral portion thereof. Those claw portions 13b are bent and molded in an axial direction so as to have bisected distal ends. Then, the claw portions 13b are inserted into cutout recessed portions 14e (see FIG. 7c) of the lever-side outer ring 14, which are described later. Lastly, the distance between each of the bisected distal ends is increased outward. In this manner, the lever-side side plate 13 is fixed to the lever-side outer ring 14 by swaging. Note that, in the figures, a plurality of (four, for example) holes for mounting the operation lever (not shown) for adjusting a height of a seat to the lever-side side plate 13 are represented by reference symbol 13c.

FIGS. 7a to 7c illustrate the lever-side outer ring 14. The lever-side outer ring 14 is obtained by molding a plate-like material into a cup-shape through press working, and comprises a hole 14b formed in a center portion 14c, through which the output shaft 22 and the inner ring 15 are inserted. On an inner periphery of a cylindrical portion 14d extending from the center portion 14c in the axial direction, a plurality of cam surfaces 14a are equiangularly formed (see FIG. 4).

On an outer peripheral portion of the lever-side outer ring 14, a plurality of (three, for example) claw portions 14f and 14g are provided in a protruding manner and bent and molded in the axial direction. Of those claw portions 14f and 14g, the one claw portion 14f is locked by being inserted and arranged between two lock portions 19a (see FIGS. 12 and 27) of the outer centering spring 19 described later. In a state of being in contact with an end surface of the brake-side outer ring 23 described later, the other two claw portions 14g slide on the end surface of the brake-side outer ring 23 in accordance with rotation of the lever-side outer ring 14, and move between a pair of lock portions 24e and 24f (see FIG. 16b) as rotation stoppers provided on an outer periphery of the cover 24 so as to be abuttable on the lock portion 24e and 24f, respectively, at moving ends in a rotational direction. In this manner, an operating angle of the lever 41a (see FIG. 29) is restricted.

The plurality of (five in the figure) cutout recessed portions 14e into which the claw portions 13b (see FIGS. 6a and 6b) of the lever-side side plate 13 are inserted are formed on an outer periphery of the lever-side outer ring 14. By swaging the claw portions 13b of the lever-side side plate 13, which are inserted into the cutout recessed portions 14e, the lever-side side plate 13 and the lever-side outer ring 14 are coupled to each other. The lever-side outer ring 14 and the lever-side side plate 13 fixed by swaging to the lever-side outer ring 14 constitute the input-side member of the lever-side clutch section 11.

Figure 8B:
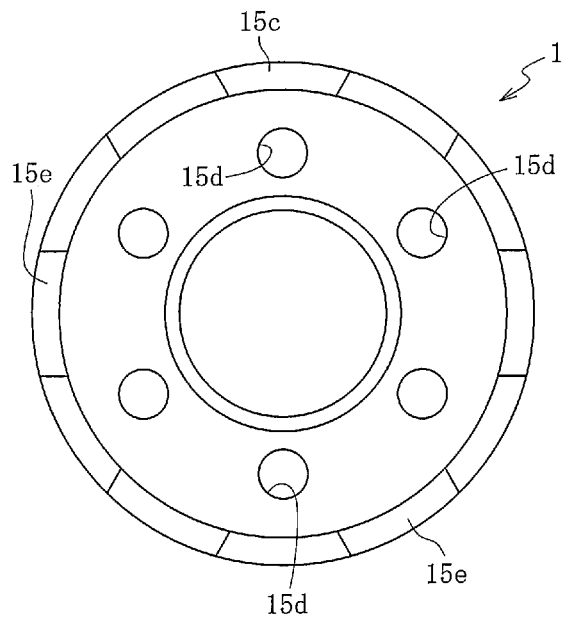
Figure 8A:
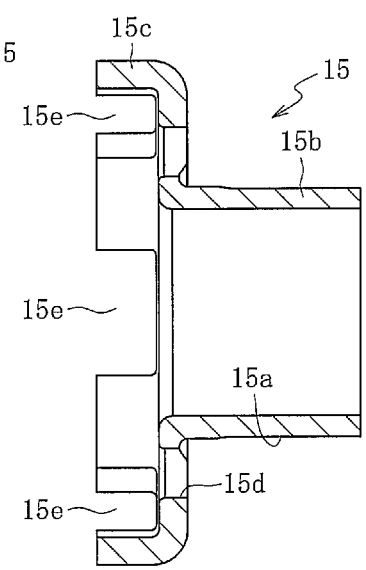
FIG. 8a is a sectional view illustrating an inner ring.
Figure 9:
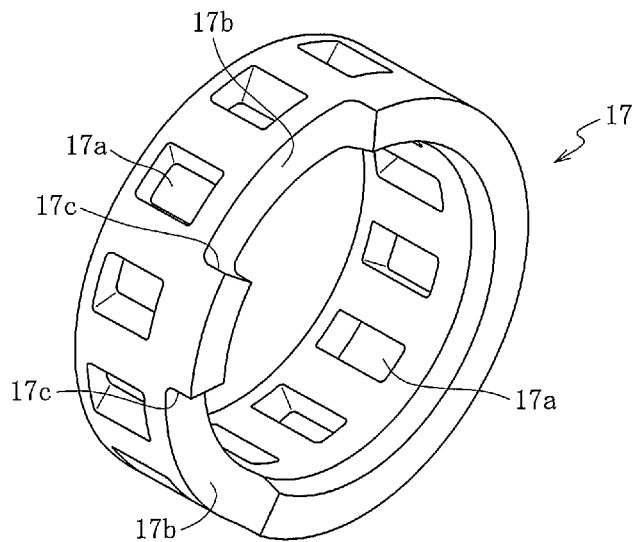
FIG. 9 is a perspective view illustrating a cage.
Figure 10C:
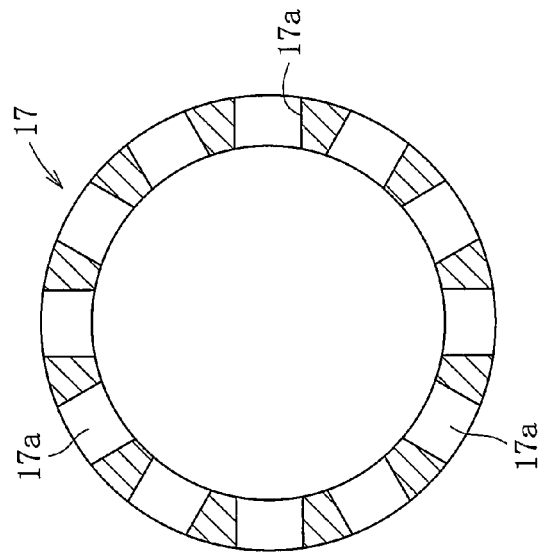
Figure 10A:
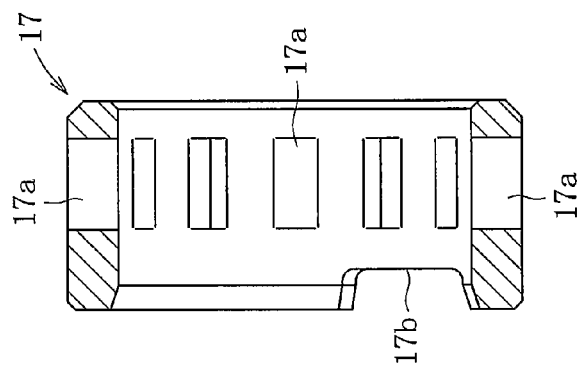
FIG. 10a is a sectional view illustrating the cage.
Figure 10B:
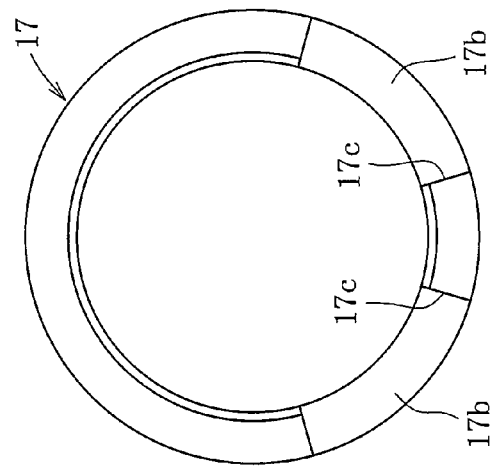

FIGS. 8a and 8b illustrate the inner ring 15. The inner ring 15 is provided with the outer peripheral surface 15a formed on an outer diameter of a cylindrical portion 15b into which the output shaft 22 is inserted, the wedge gaps 20 (see FIG. 4) being formed between the outer peripheral surface 15a and the cam surfaces 14a of the lever-side outer ring 14. Further, a larger diameter portion 15c extending from an end portion of the cylindrical portion 15b in a radially outer direction and bending in the axial direction is integrally formed. In order to cause the larger diameter portion 15c to function as a cage for the brake-side clutch section 12, pockets 15e for accommodating the cylindrical rollers 27 and the plate springs 28 are equiangularly formed in the larger diameter portion 15c. Note that, in the figures, holes into which the protrusions 22f of the output shaft 22 (see FIG. 1) are inserted with clearances are represented by a reference symbol 15d.

FIGS. 9, and 10a to 10c illustrate the cage 17 made of a resin. The cage 17 is a cylindrical member in which a plurality of pockets 17a for accommodating the cylindrical rollers 16 are equiangularly formed. Two cutout recessed portions 17b are formed in one end portion of the cage 17, and lock portions 18a of the above-mentioned inner centering spring 18 are locked to two adjacent end surfaces 17c of the respective cutout recessed portions 17b (see FIGS. 11 and 27).

Figure 11:
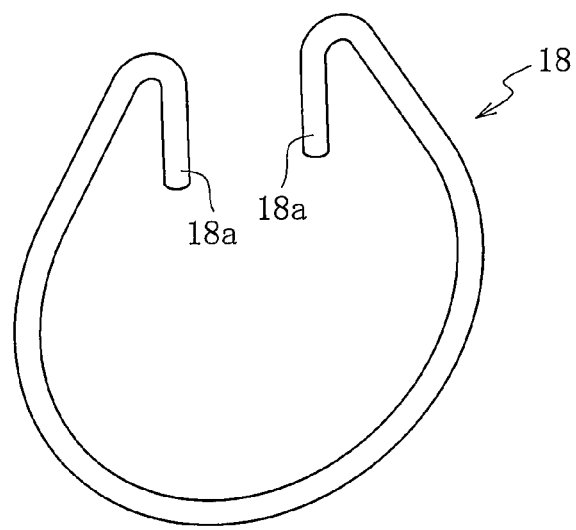
FIG. 11 is a perspective view illustrating an inner centering spring.

FIG. 11 illustrates the inner centering spring 18. The inner centering spring 18 is a spring member having a circular C-shape in cross-section and comprising a pair of the lock portions 18a bent to a radially inner side, and is situated on the radially inner side of the outer centering spring 19 (see FIG. 27). The inner centering spring 18 is arranged between the cage 17 and the cover 24 serving as a stationary-side member of the brake-side clutch section 12. In addition, both the lock portions 18a are locked to the two end surfaces 17c (see FIGS. 9 and 10b) of the cage 17 and locked to a claw portion 24b (see FIGS. 16a and 16b) provided to the cover 24 (see FIGS. 28a and 28b).

At the time of application of rotational torque input from the lever-side outer ring 14 in the inner centering spring 18, one of the lock portions 18a is engaged with one of the end surfaces 17c of the cage 17, and the other of the lock portions 18a is engaged with the claw portion 24b of the cover 24. Thus, the inner centering spring 18 is pressed and extended in accordance with rotation of the lever-side outer ring 14 so as to accumulate an elastic force. At the time of releasing the rotational torque input from the lever-side outer ring 14, the cage 17 is restored to a neutral state with the elastic restoring force.

Figure 12:
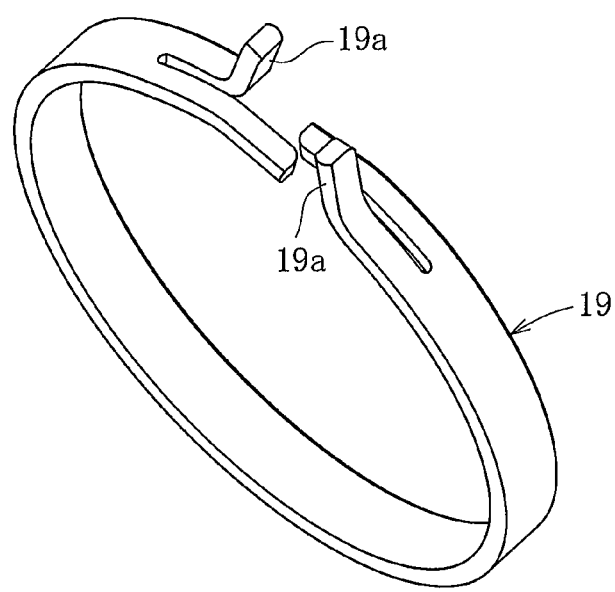
FIG. 12 is a perspective view illustrating an outer centering spring.
Figure 13B:
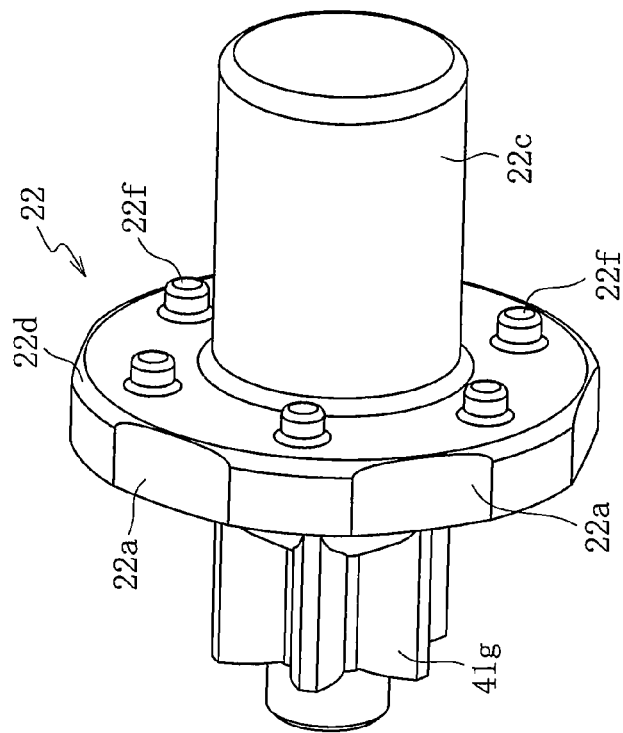
FIG. 13b is a perspective view of the output shaft as seen from another side.
Figure 13A:
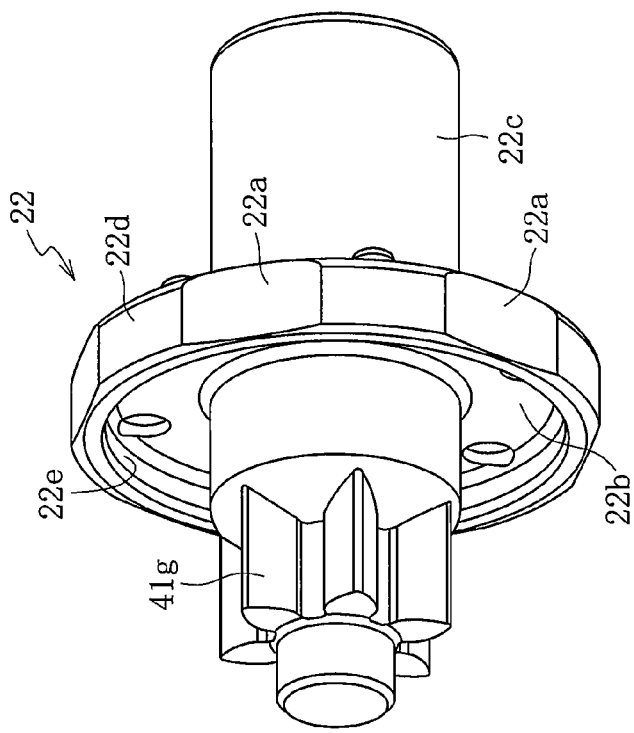
FIG. 13a is a perspective view of an output shaft as seen from one side.
Figure 14C:
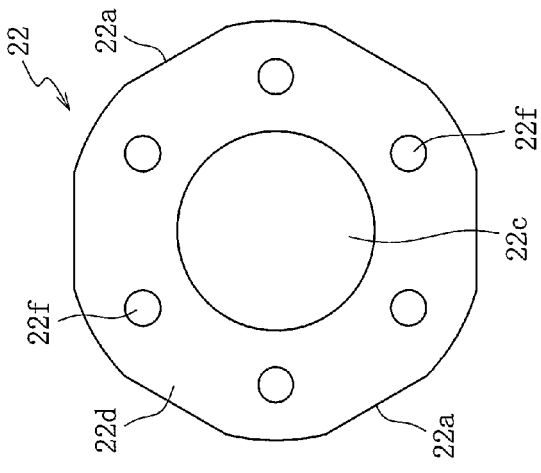
Figure 14A:
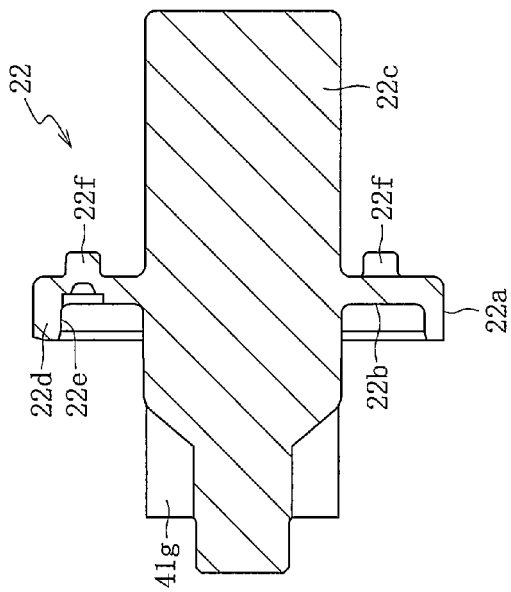
FIG. 14a is a sectional view illustrating the output shaft.
Figure 14B:
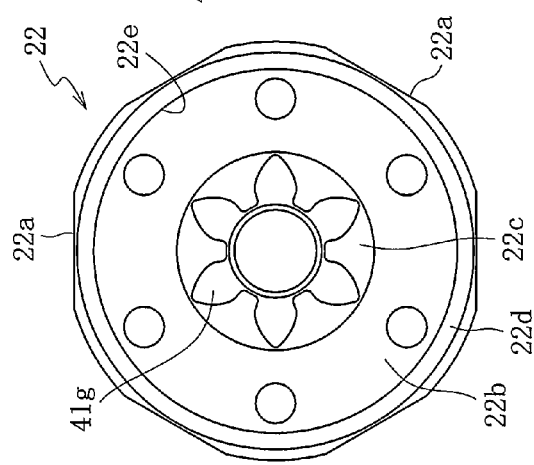

FIG. 12 illustrates the outer centering spring 19. The outer centering spring 19 is a C-shaped and band plate-like spring member comprising the pair of lock portions 19a formed by bending both the ends thereof to a radially outer side, and is situated on a radially outer side of the inner centering spring 18 (see FIG. 27). The outer centering spring 19 is arranged between the lever-side outer ring 14 of the lever-side clutch section 11 and the cover 24 of the brake-side clutch section 12. Both the lock portions 19a are locked to the claw portion 14f (see FIGS. 7a to 7c) provided to the lever-side outer ring 14, and also locked to a claw portion 24d (see FIGS. 16a and 16b) provided to the cover 24 (see FIGS. 28a and 28b). The lock portions 19a are arranged while being displaced (by 180°) in a circumferential direction with respect to the lock portions 18a of the inner centering spring 18 (see FIG. 27).

In the outer centering spring 19, when the rotational torque input from the lever-side side plate 13 is applied through operation of the lever 41a (see FIG. 29) so as to rotate the lever-side outer ring 14, one of the lock portions 19a is engaged with the claw portion 14f of the lever-side outer ring 14, and the other of the lock portions 19a is engaged with the claw portion 24d of the cover 24, respectively. Thus, the outer centering spring 19 is pressed and extended in accordance with the rotation of the lever-side outer ring 14 so as to accumulate an elastic force. When the rotational torque input from the lever-side outer ring 14 is released, the lever-side outer ring 14 is restored to a neutral state with the elastic restoring force.

FIGS. 13a and 13b and FIGS. 14a to 14c illustrate the output shaft 22. The output shaft 22 comprises a larger diameter portion 22d that extends from a shaft portion 22c to the radially outer side to be increased in diameter, and is integrally formed substantially in an axial center region of the output shaft 22. A pinion gear 41g to be coupled to a seat-lifter section 41 is coaxially formed on a distal end of the shaft portion 22c.

A plurality of (six, for example) flat cam surfaces 22a are equiangularly formed on an outer peripheral surface of the larger diameter portion 22d, and the two cylindrical rollers 27 and the plate spring 28 are arranged in each wedge gap 26 (see FIG. 5) provided between the cam surfaces 22a and an inner peripheral surface 23b of the brake-side outer ring 23. In one end surface of the larger diameter portion 22d, there is formed an annular recessed portion 22b in which a friction ring 29 is accommodated and arranged. Further, in the figures, protrusions formed on the other end surface of the larger diameter portion 22d are represented by reference symbol 22f, the protrusions being inserted into the holes 15d of the inner ring 15 with clearances (see FIGS. 1, 8a, and 8b).

Figure 15B:
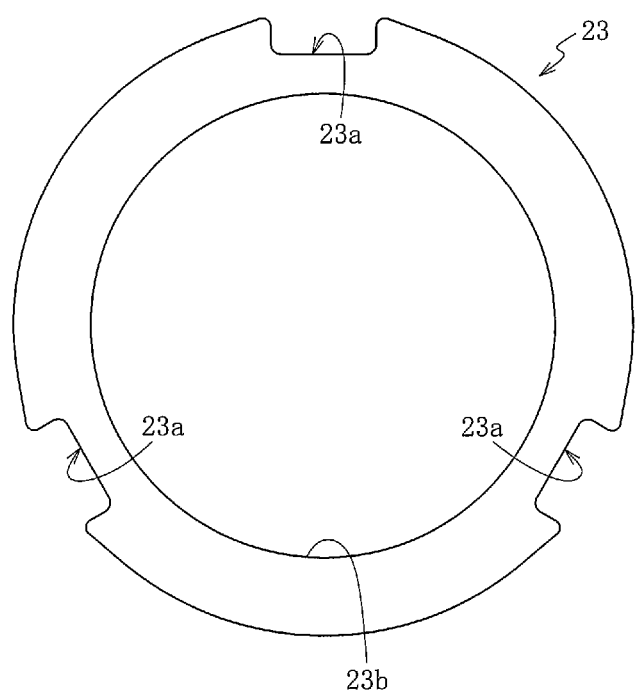
Figure 15A:
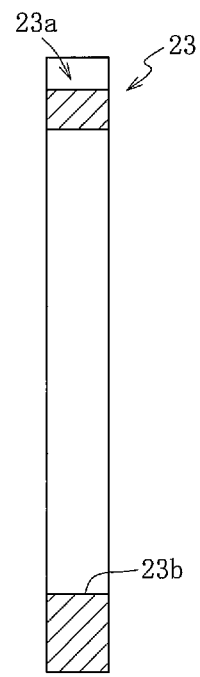
FIG. 15a is a sectional view illustrating a brake-side outer ring.
Figure 16A:
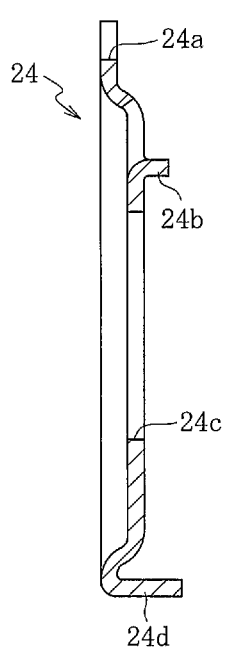
FIG. 16a is a sectional view illustrating a cover.
Figure 16B:
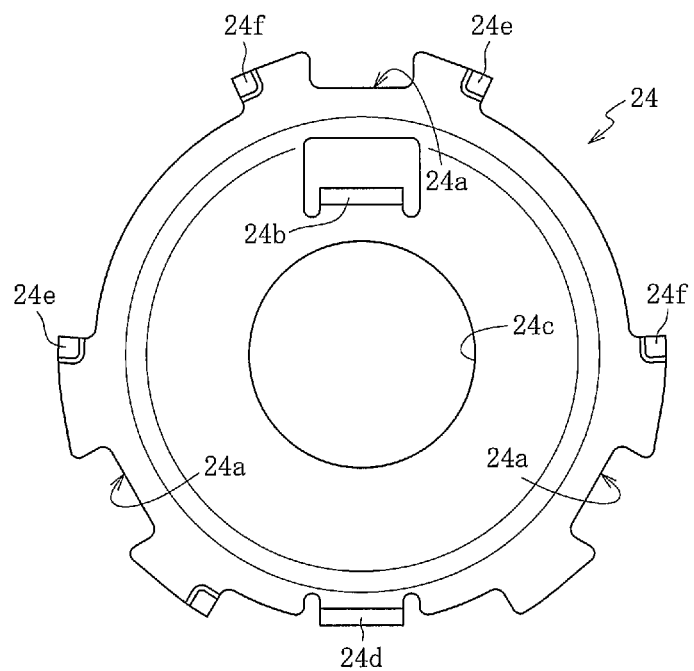

FIGS. 15a and 15b illustrate the brake-side outer ring 23, and FIGS. 16a and 16b illustrate the cover 24. FIGS. 17a and 17b illustrate the brake-side side plate 25. The brake-side outer ring 23 and the cover 24 described above are integrally fixed to each other with the brake-side side plate 25 by swaging. The brake-side outer ring 23 is formed of a thick plate-like member obtained by punching of a single material with a press, and the cover 24 is molded by pressing of another single material. Note that, in the figures, holes into which the output shaft 22 is inserted are represented by reference symbols 24c and 25b, and holes to which protrusions 29a of the friction ring 29 described later are fitted are represented by reference symbol 25c.

Figure 24A:
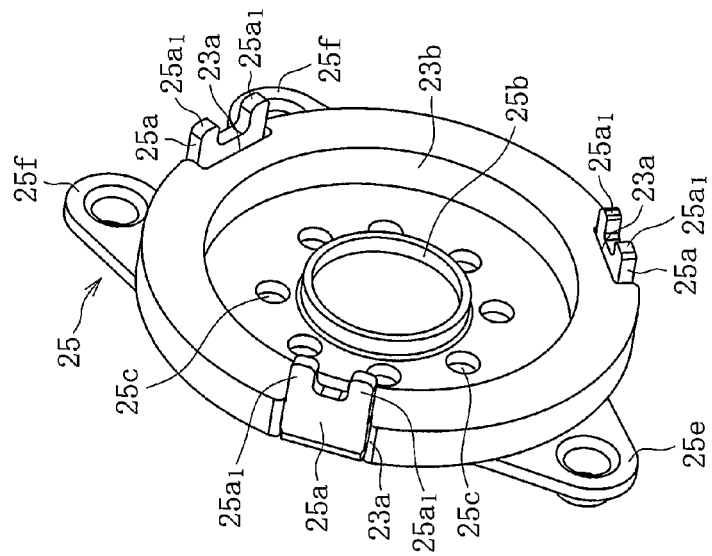
FIG. 24a is a perspective view illustrating a state before the brake-side outer ring is assembled to the brake-side side plate.
Figure 24B:
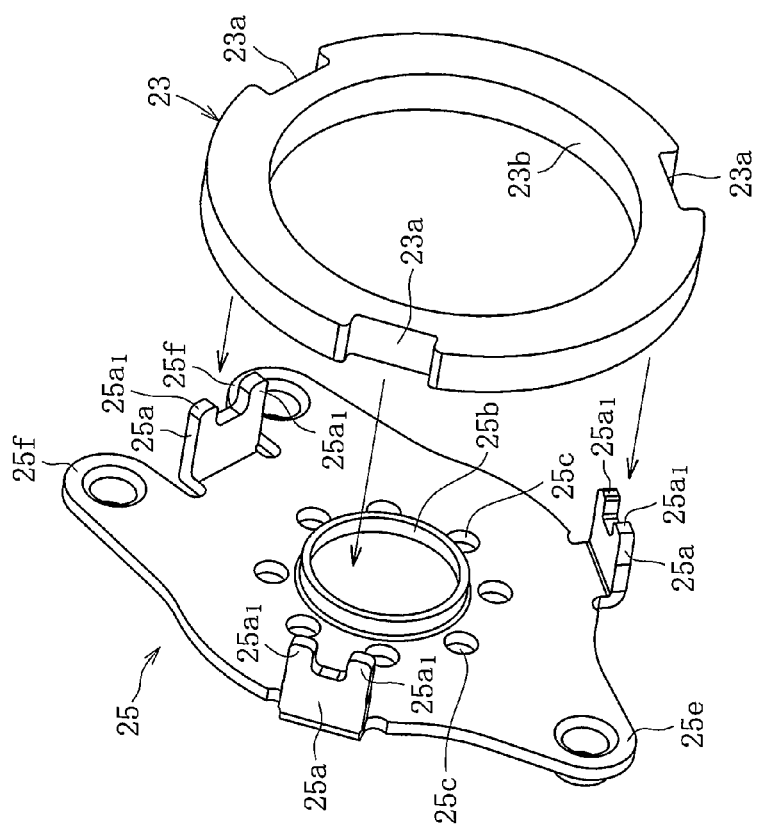
FIG. 24b is a perspective view illustrating a state after the brake-side outer ring is assembled to the brake-side side plate.
Figure 25:
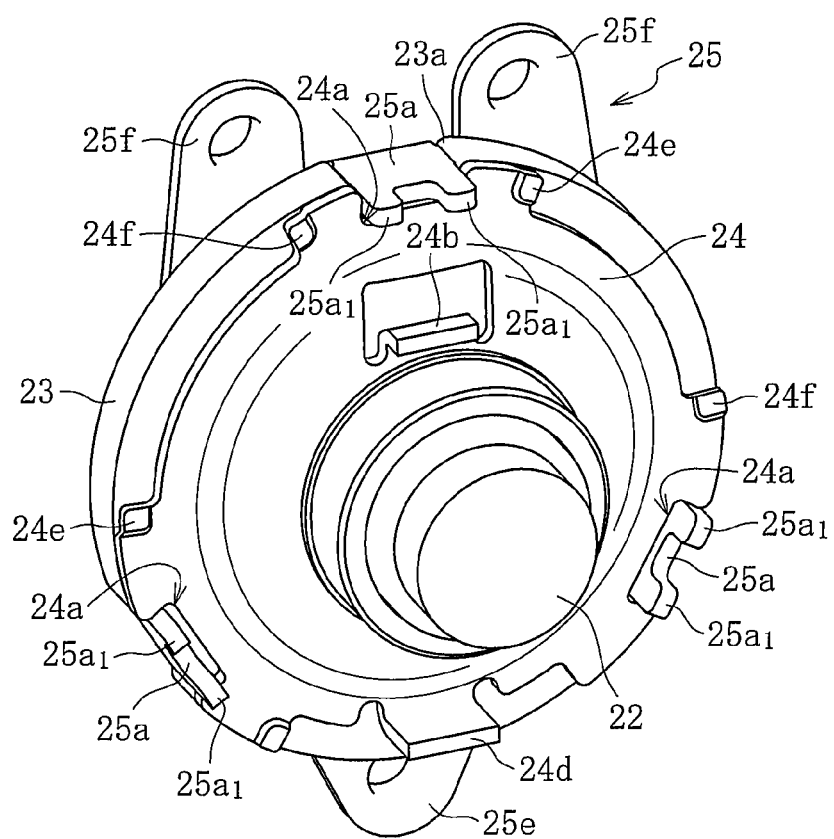
FIG. 25 is a perspective view illustrating a state in which the brake-side outer ring and the cover are assembled to the brake-side side plate.
Figure 26:
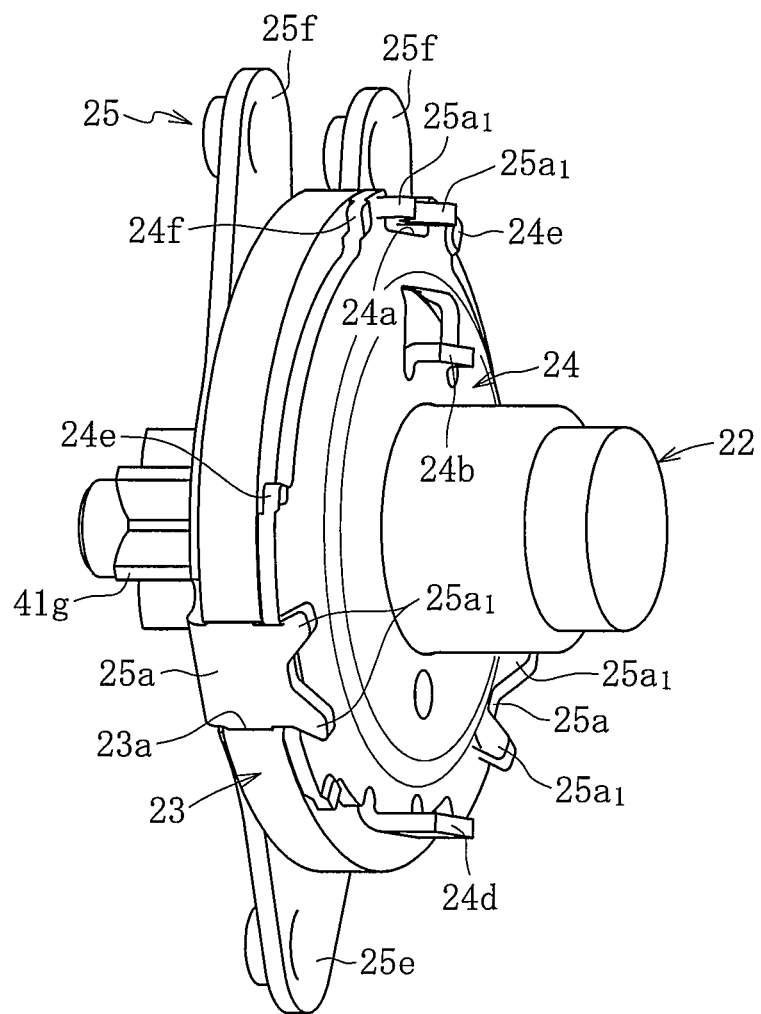
FIG. 26 is a perspective view illustrating a state in which the brake-side side plate, the brake-side outer ring, and the cover are integrated with one another by swaging.
Figure 27:
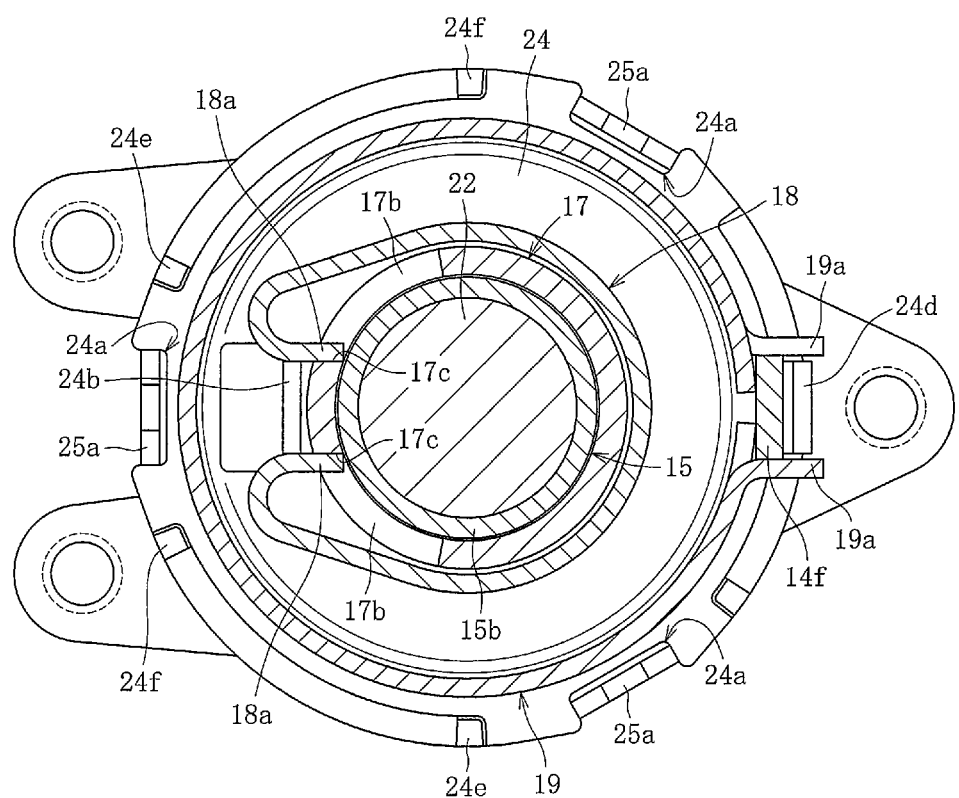
FIG. 27 is a sectional view taken along the line C-C of FIG. 1.

A plurality of (three) cutout recessed portions 23a are formed on an outer periphery of the brake-side outer ring 23. Correspondingly to the cutout recessed portions 23a, a plurality of (three) cutout recessed portions 24a are similarly formed on an outer periphery of the cover 24. As illustrated in FIGS. 24a and 24b, claw portions 25a of the brake-side side plate 25 are inserted into the cutout recessed portions 23a of the brake-side outer ring 23, respectively. Further, as illustrated in FIG. 25, the claw portions 25a of the brake-side side plate 25 are inserted into the cutout recessed portions 24a of the cover 24, respectively.

The claw portions 25a of the brake-side side plate 25 are inserted into the cutout recessed portions 23a and 24a. By swaging the claw portions 25a of the brake-side side plate 25, the brake-side outer ring 23 and the cover 24 are coupled to each other and integrated with the brake-side side plate 25, to thereby form the stationary-side member. Swaging of the claw portions 25a of the brake-side side plate 25 is performed by increasing outward the distance between bisected distal end portions $25a_1$ of each of the claw portions 25a with use of a swage (not shown) (see FIGS. 26, 28a, and 28b).

The wedge gaps 26 are formed between the inner peripheral surface 23b of the brake-side outer ring 23 and the cam surfaces 22a of the output shaft 22 (see FIG. 5). The cover 24 is provided with the claw portion 24b protruding in the axial direction, the claw portion 24b being arranged between the two lock portions 18a of the inner centering spring 18 of the lever-side clutch section 11 (see FIGS. 11, 27, 28a, and 28b). The claw portion 24b of the cover 24 is formed by raising the surface of the cover 24 on the radially outer side of the claw-portion-formation position. The claw portion 24d protruding in the axial direction is formed on the outer periphery of the cover 24. The claw portion 24d is arranged between the two lock portions 19a of the outer centering spring 19 of the lever-side clutch section 11 (see FIGS. 12, 27, 28a and 28b).

Figure 28A:
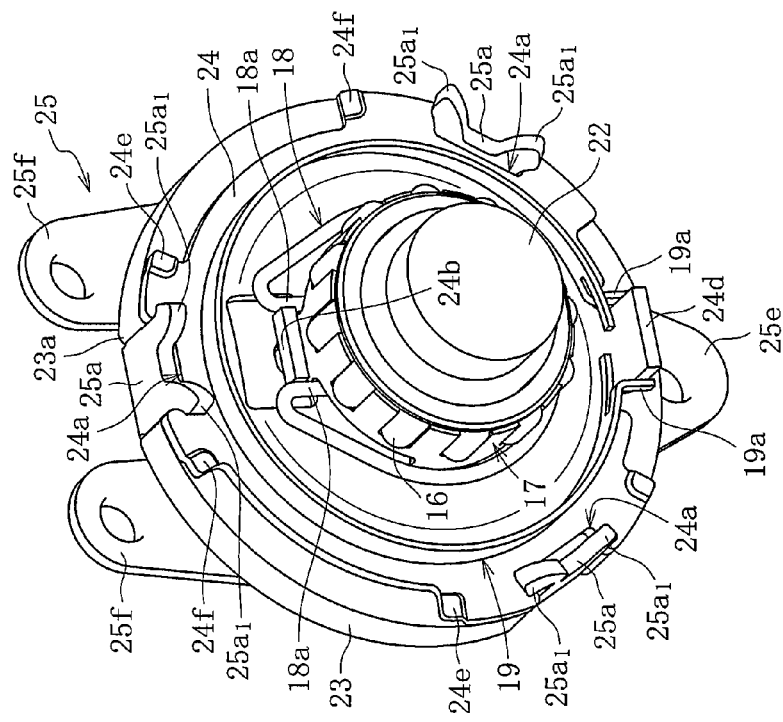
FIG. 28a is a perspective view illustrating a state before the cage is assembled to the brake-side side plate, the brake-side outer ring, the cover, and the inner centering spring.
Figure 28B:
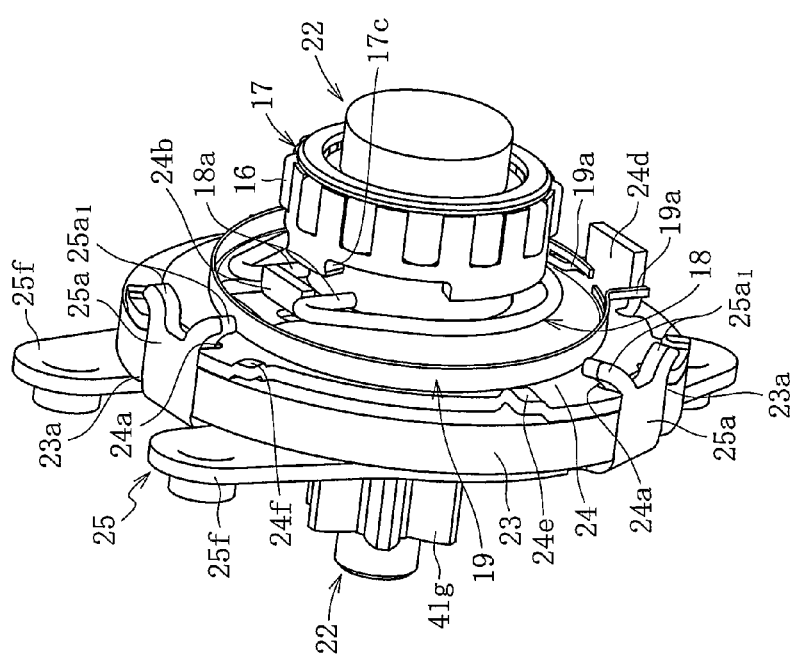
FIG. 28b is a perspective view illustrating a state after the cage is assembled to the brake-side side plate, the brake-side outer ring, the cover, and the inner centering spring.

Two pairs of the lock portions 24e and 24f are formed by stepping on the outer periphery of the cover 24 (see FIGS. 28a and 28b). In a state in which the cover 24 is held in contact with the end surface of the brake-side outer ring 23, in accordance with rotation of the lever-side outer ring 14, the lock portions 24e and 24f are allowed to be brought into abutment, in a rotational direction, on the claw portions 14g, which slide on the end surface of the brake-side outer ring 23. As a result, the lock portions 24e and 24f function as rotation stoppers for restricting an operating angle of the lever 41a (see FIG. 29). In other words, when the lever-side outer ring 14 is rotated through operation of the lever, the claw portions 14g thereof move along the outer periphery of the cover 24 between the lock portions 24e and 24f of the cover 24.

On the outer periphery of the brake-side sideplate 25, one flange portion 25e and two flange portions 25f are provided as clutch mounting portions with respect to the seat-lifter section (see FIGS. 2 to 4). In distal end portions of those three flange portions 25e and 25f, there are formed, by boring, mounting holes 25g and 25h for allowing mounting with respect to the seat-lifter section, and there are protrudingly formed, in the axial direction, cylindrical portions 25i and 25j in a manner of surrounding the mounting holes 25g and 25h.

Figure 18C:
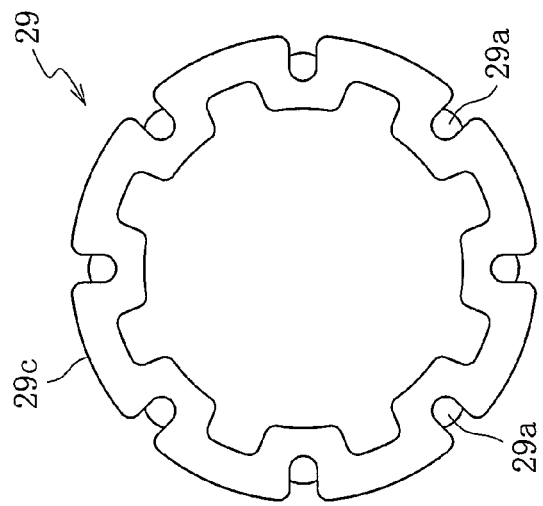
Figure 18A:
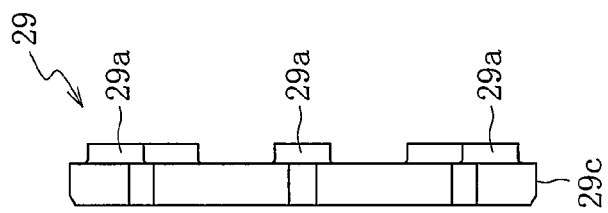
FIG. 18a is a front view illustrating a friction ring.
Figure 18B:
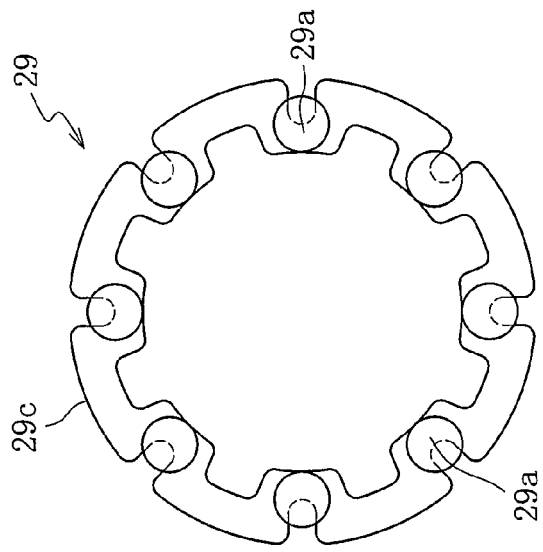

FIGS. 18a to 18c illustrate the friction ring 29 made of a resin. On an end surface of the friction ring 29, the plurality of circular protrusions 29a are equiangularly formed. By pressfitting and engaging the protrusions 29a into the holes 25c of the brake-side side plate 25, the friction ring 29 is fixed to the brake-side side plate 25 (see FIGS. 1 and 3). The friction ring 29 is press-fitted to an inner peripheral surface 22e of the annular recessed portion 22b formed in the larger diameter portion 22d of the output shaft 22 with fastening allowance (see FIGS. 13a, 14a and 14b). Due to a frictional force generated between an outer peripheral surface 29c of the friction ring 29 and the inner peripheral surface 22e of the annular recessed portion 22b of the output shaft 22, rotational resistance is imparted to the output shaft 22.

Figure 19:
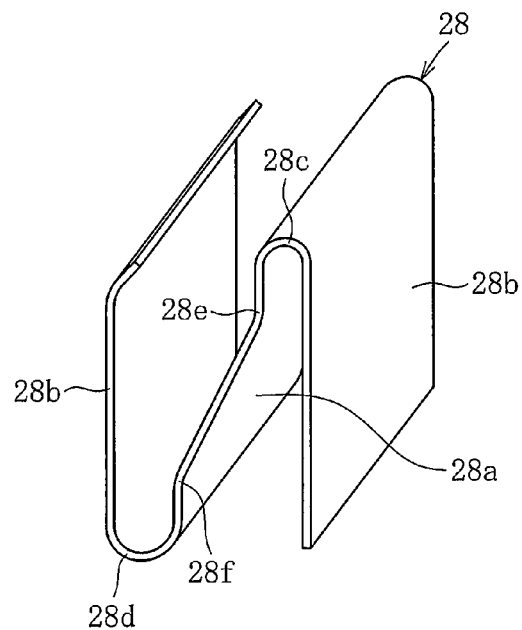
FIG. 19 is an enlarged perspective view illustrating a plate spring of FIG. 5.
Figure 20:
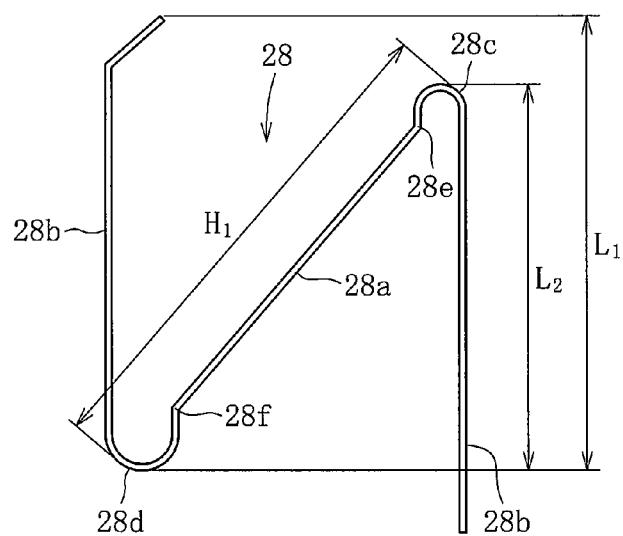
FIG. 20 is a front view illustrating the plate spring of FIG. 19.

FIGS. 19 and 20 illustrate the plate spring 28 inserted between the two cylindrical rollers 27 in the wedge gap 26 formed between the inner peripheral surface 23b of the brakeside outer ring 23 and the cam surface 22a of the output shaft 22 described above. The plate spring 28 has an N-shape in cross section that comprises an intermediate oblique portion 28a and upright portions 28b formed by folding both ends of the intermediate oblique portion 28a and extending both the ends in opposite directions. An outside dimension $H_1$ (see FIG. 20) between both the ends of the intermediate oblique portion 28a is set smaller than a maximum gap dimension $H_2$ (see FIG. 21) of the wedge gap 26 formed between the inner peripheral surface 23b of the brake-side outer ring 23 and the cam surface 22a of the output shaft 22 ($H_1 < H_2$).

Figure 21:
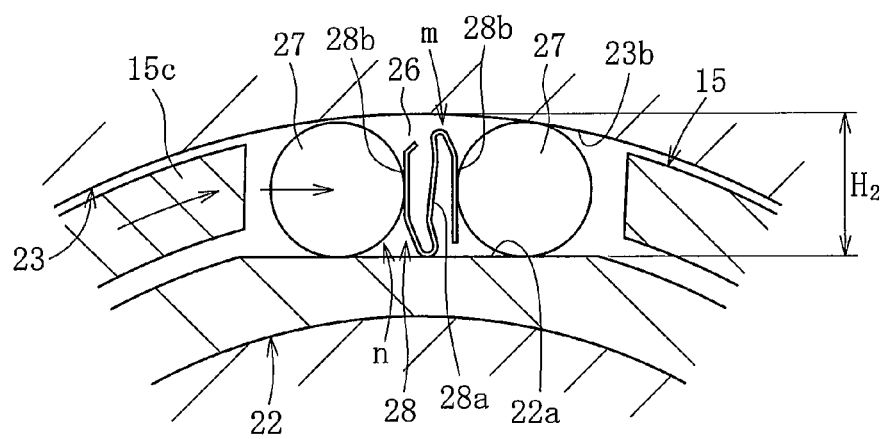
FIG. 21 is an enlarged main part sectional view illustrating the plate spring and cylindrical rollers at the time of operation of a brake-side clutch section.

As described above, in the plate spring 28 having an N-shape in cross section, for imparting a repulsive force to the cylindrical rollers 27, the outside dimension $H_1$ between both the ends of the intermediate oblique portion 28a is set smaller than the maximum gap dimension $H_2$ of the wedge gap 26 formed between the inner peripheral surface 23b of the brake-side outer ring 23 and the cam surface 22a of the output shaft 22, and thus, at the time of actuation of the brake-side clutch section 12 through the lever operation, as illustrated in FIG. 21, a gap m is formed between the inner peripheral surface 23b of the brake-side outer ring 23 and one end of the intermediate oblique portion 28a of the plate spring 28 that is pressed and deformed by the cylindrical rollers 27.

Figure 35:
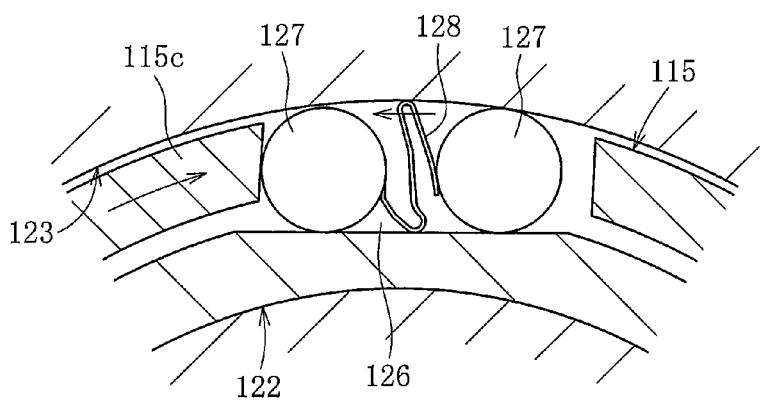
FIG. 35 is an enlarged main part sectional view illustrating the plate spring and the cylindrical rollers after the start of the operation of the brake-side clutch section.
Figure 36:
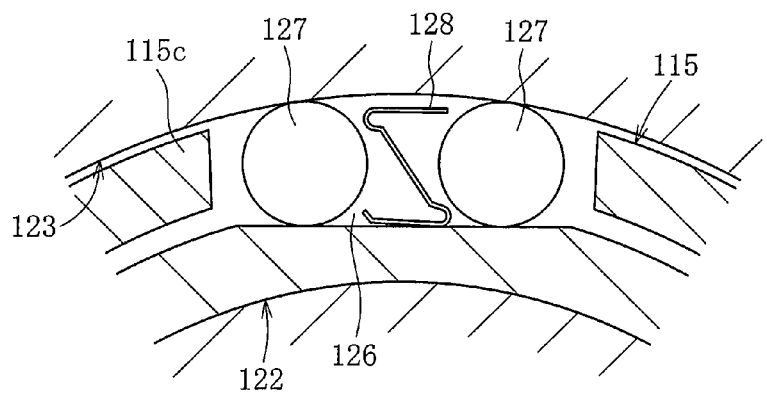
FIG. 36 is an enlarged main part sectional view illustrating a state in which the plate spring of FIG. 35 falls down.

As a result, the plate spring 28 is not subjected to the moment load under the state in which the cylindrical rollers 27 are located close to each other, and hence it is possible to avoid such a situation that the intermediate oblique portion 28a of the plate spring 28 is brought into the state of being caught in the wedge gap 26 formed between the inner peripheral surface 23b of the brake-side outer ring 23 and the cam surface 22a of the output shaft 22 (see FIG. 35). Further, the plate spring 28 is not brought into the state of falling down (see FIG. 36). Thus, the plate spring 28 is easily restored to the initial state so that satisfactory actuation performance can be secured.

Further, in the plate spring 28, a length dimension $L_1$ of the upright portion 28b is set at least ¾ of the radius of the cylindrical roller 27 (see FIG. 20). With this setting, at the time of actuation of the brake-side clutch section 12 through the lever operation, it is possible to avoid, as illustrated in FIG. 21, such a situation that the upright portion 28b of the plate spring 28 that is pressed and deformed by the cylindrical rollers 27 enters a gap n formed between the cam surface 22a of the output shaft 22 and the cylindrical roller 27, and hence the plate spring 28 can be prevented in advance from falling down.

Note that, when the length dimension $L_1$ of the upright portion 28b is smaller than ¾ of the radius of the cylindrical roller 27, the length dimension $L_1$ of the upright portion 28b cannot be secured sufficiently, and at the time of actuation of the brake-side clutch section 12 through the lever operation, the upright portion 28b of the plate spring 28 that is pressed and deformed by the cylindrical rollers 27 easily enters the gap n formed between the cam surface 22a of the output shaft 22 and the cylindrical roller 27.

Further, in the plate spring 28, the length dimension $L_1$ of the upright portion 28b is set larger than a separation dimension $L_2$ between both the ends of the intermediate oblique portion 28a, which is a dimension determined in parallel to the upright portion 28b (see FIG. 20). With this setting, at the time of actuation of the brake-side clutch section 12 through the lever operation, it is possible to avoid such a situation that the upright portion 28b of the plate spring 28 that is pressed and deformed by the cylindrical rollers 27 enters the gap n formed between the cam surface 22a of the output shaft 22 and the cylindrical roller 27, and hence the plate spring 28 can be prevented in advance from falling down.

Note that, when the length dimension $L_1$ of the upright portion 28b is smaller than the separation dimension $L_2$ between both the ends of the intermediate oblique portion 28a, which is the dimension determined in parallel to the upright portion 28b, the length dimension $L_1$ of the upright portion 28b cannot be secured sufficiently, and at the time of actuation of the brake-side clutch section 12 through the lever operation, the upright portion 28b of the plate spring 28 that is pressed and deformed by the cylindrical rollers 27 easily enters the gap n formed between the cam surface 22a of the output shaft 22 and the cylindrical roller 27.

Note that, the above-mentioned plate spring 28 comprises folding portions 28c and 28d having a round shape in cross section, which are formed between the intermediate oblique portion 28a and the upright portions 28b. One folding portion 28c is different in size from another folding portion 28d. This embodiment describes, for example, a case where the one folding portion 28c has a smaller round shape and the another folding portion 28d has a larger round shape (see FIGS. 19 and 20).

Figure 22:
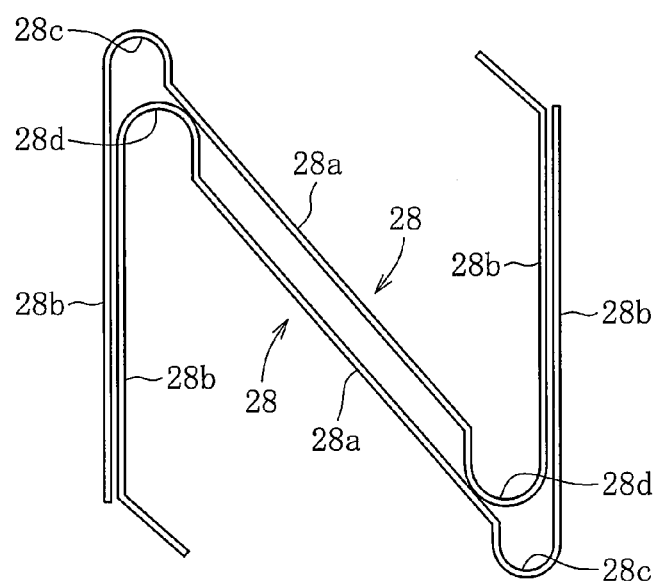
FIG. 22 is a front view illustrating an example of a state in which two plate springs are stacked one on top of another.

As described above, the one folding portion 28c and the another folding portion 28d are formed into the round shapes that are different in size, and thus, in a case where a plurality of plate springs 28 are brought into a state of being stacked one on top of another so as to handle the plate springs 28 at the time of transportation thereof, the plurality of plate springs 28 are stacked one on top of another so that the one folding portion 28c and the another folding portion 28d are positioned in an alternate manner in the vertical direction as illustrated in FIG. 22. Then, the one folding portion 28c and the another folding portion 28d held in contact with each other in the vertical direction have the round shapes that are different in size, and hence the folding portions 28c and 28d do not fit each other. As a result, it is possible to avoid such a situation that the plate springs 28 are brought into a close contact state, and to facilitate work of separating the plate springs 28 when assembling each of the plate springs 28 to the brake-side clutch section 12.

Further, the plate spring 28 comprises bending portions 28e and 28f for connecting the intermediate oblique portion 28a to the respective folding portions 28c and 28d. One bending portion 28e is different in curvature radius from another bending portion 28f (see FIGS. 19 and 20). This embodiment describes, for example, a case where the one bending portion 28e for connecting the intermediate oblique portion 28a to the folding portion 28c has a larger curvature radius and the another bending portion 28f for connecting the intermediate oblique portion 28a to the folding portion 28d has a smaller curvature radius.

Figure 23:
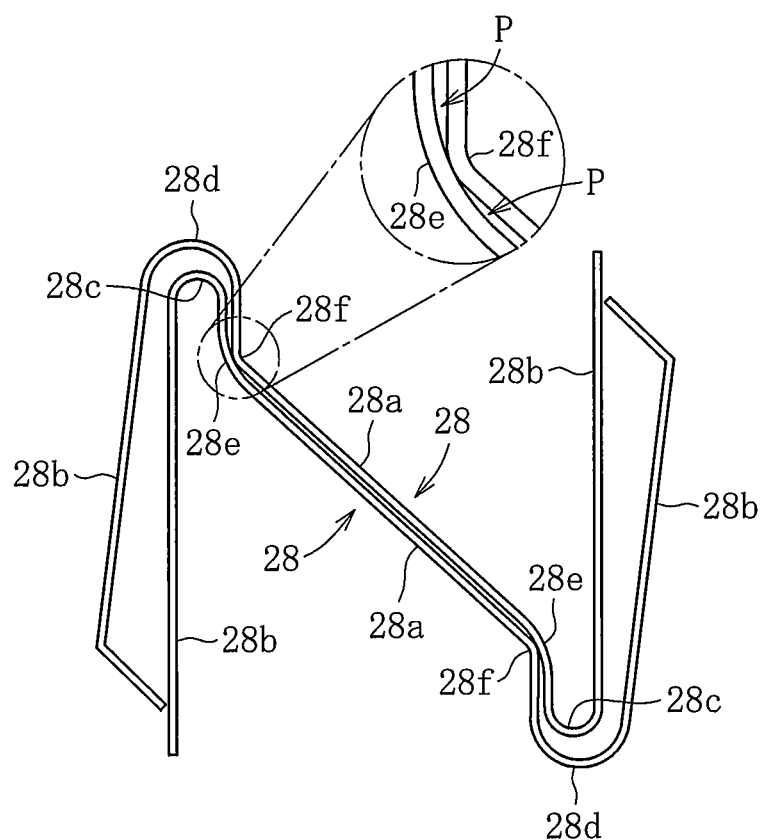
FIG. 23 is a front view illustrating another example of the state in which the two plate springs are stacked one on top of another.

As described above, the one bending portion 28e and the another bending portion 28f have the different curvature radii, and thus, in the case where a plurality of plate springs 28 are brought into a state of being stacked one on top of another so as to handle the plate springs 28 at the time of transportation thereof, the plurality of plate springs 28 are stacked one on top of another so that the one bending portion 28e and the another bending portion 28f are positioned in an alternate manner in the vertical direction as illustrated in FIG. 23. Then, the one bending portion 28e and the another bending portion 28f held in contact with each other in the vertical direction have the different curvature radii, and hence gaps p are formed in the vicinity of the bending portions 28e and 28f positioned in the vertical direction. As a result, it is possible to avoid such a situation that the plate springs 28 are brought into a close contact state, and to facilitate the work of separating the plate springs 28 when assembling each of the plate springs 28 to the brake-side clutch section 12.

Description is made on operation of the lever-side clutch section 11 and the brake-side clutch section 12 of the clutch unit X structured as described above.

In the lever-side clutch section 11, when the input rotational torque is applied to the lever-side outer ring 14, the cylindrical rollers 16 are engaged into the wedge gaps 20 between the lever-side outer ring 14 and the inner ring 15. The inner ring 15 is rotated with rotational torque transmitted to the inner ring through intermediation of the cylindrical rollers 16. Simultaneously, an elastic force is accumulated in both the centering springs 18 and 19 in accordance with the rotation of the lever-side outer ring 14 and the cage 17. When the input rotational torque is interrupted, the lever-side outer ring 14 and the cage 17 are restored to a neutral state with the elastic force of both the centering springs 18 and 19. Meanwhile, the inner ring 15 is maintained at the given rotational position. Accordingly, the inner ring 15 is rotated in an inching manner with repetitive rotation of the lever-side outer ring 14, in other words, pumping operation of the operation lever.

In the brake-side clutch section 12, when reverse-input rotational torque is input to the output shaft 22, the cylindrical rollers 27 are engaged into the wedge gap 26 between the output shaft 22 and the brake-side outer ring 23 so as to lock the output shaft 22 with respect to the brake-side outer ring 23. Therefore, the rotational torque reversely input from the output shaft 22 is locked by the brake-side clutch section 12 so as to interrupt back-flow of the rotational torque reversely input to the lever-side clutch section 11.

Meanwhile, the rotational torque input from the lever-side outer ring 14 is input to the inner ring 15 through intermediation of the lever-side clutch section 11. When the inner ring 15 is brought into abutment on the cylindrical rollers 27 and presses the cylindrical rollers 27 against the elastic force of the plate springs 28, the cylindrical rollers 27 are disengaged from the wedge gaps 26 and a locked state of the output shaft 22 is released. As a result, the output shaft 22 is allowed to be rotated. When the inner ring 15 is further rotated, clearances between the holes 15d of the inner ring 15 and the protrusions 22f of the output shaft 22 are narrowed, and the inner ring 15 is brought into abutment on the protrusions 22f of the output shaft 22 in a rotational direction. As a result, the rotational torque input from the inner ring 15 is transmitted to the output shaft 22 through intermediation of the protrusions 22f, and the output shaft 22 is rotated.

Figure 29:
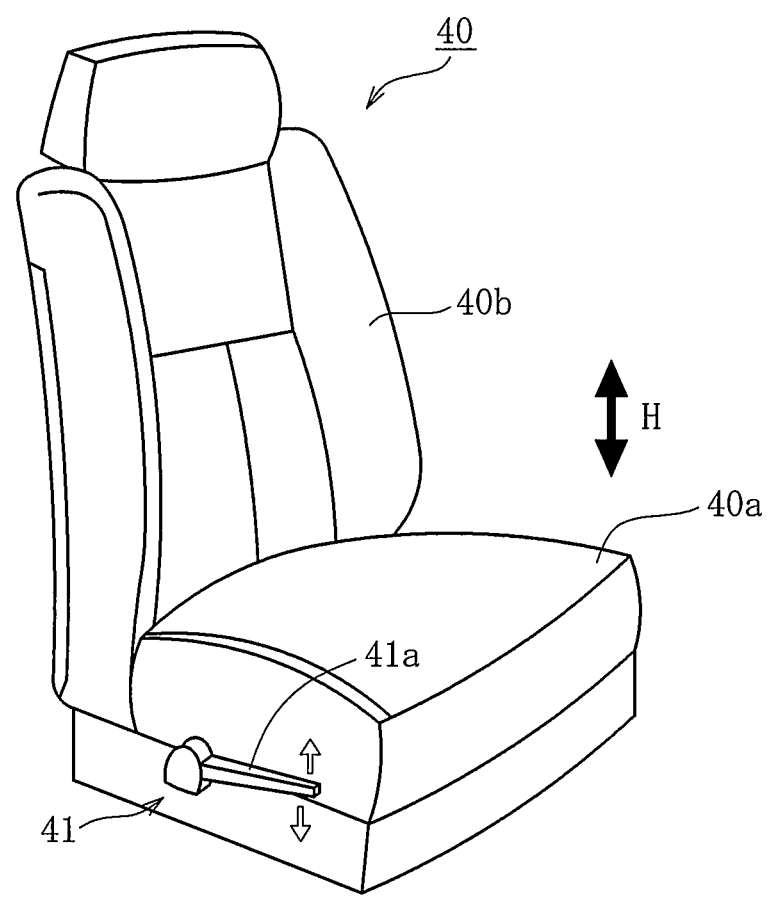
FIG. 29 is a conceptual view illustrating a seat of an automobile.

The clutch unit X provided with the structure as described above in detail is used while being incorporated into, for example, an automobile seat-lifter section. FIG. 29 illustrates a seat 40 installed in a cabin of an automobile. The seat 40 comprises a sitting seat 40a, a backrest seat 40b, the seat-lifter section 41 for adjusting a height H of the sitting seat 40a, and the like. Adjustment of the height H of the sitting seat 40a is performed with an operation lever 41a of the seat-lifter section 41.

Figure 30A:
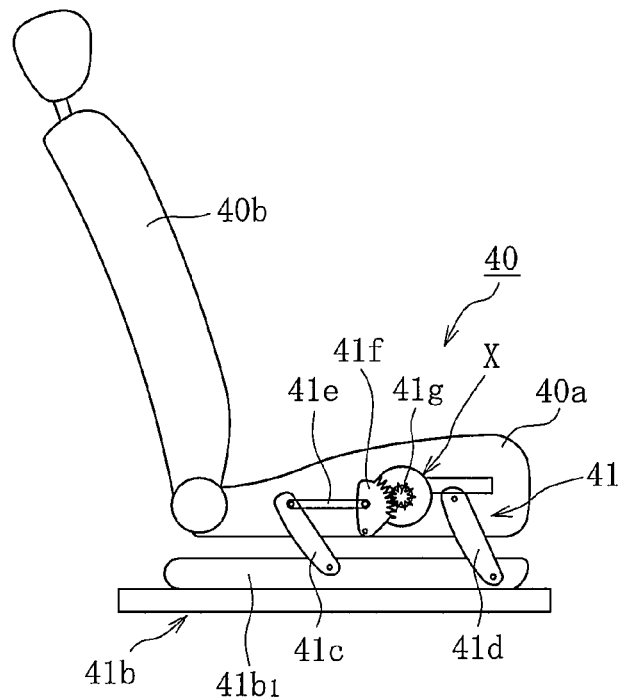
FIG. 30a is a conceptual view illustrating a structural example of a seat-lifter section.

FIG. 30a is a conceptual view of a structural example of the seat-lifter section 41. One ends of link members 41c and 41d are pivotally mounted to a slide movable member $41b_1$ of a seat slide adjuster 41b. The other ends of the link members 41c and 41d are pivotally mounted to the sitting seat 40a. The other end of the link member 41c is pivotally mounted to a sector gear 41f through intermediation of a link member 41e. The sector gear 41f is pivotally mounted to the sitting seat 40a, and pivotable about a fulcrum $41f_1$. The other end of the link member 41d is pivotally mounted to the sitting seat 40a.

The clutch unit X described above in this embodiment is fixed to an appropriate position of the sitting seat 40a. Fixation of the clutch unit X to the sitting seat 40a is fixation by swaging to a seat frame (not shown) of the sitting seat 40a, in which the three flange portions 25e and 25f of the brake-side side plate 25 are subjected to plastic deformation in such a manner that the distal end portions of the cylindrical portions 25i and 25j are increased in diameter outward.

Meanwhile, the operation lever 41a made of, for example, a resin is coupled to the lever-side side plate 13 of the lever-side clutch section 11, and the pinion gear 41g meshing with the sector gear 41f as a rotary member is provided to the output shaft 22 of the brake-side clutch section 12. As illustrated in FIGS. 1, 13a, 13b, 14a, and 14b, the pinion gear 41g is integrally formed at a distal end portion of the shaft portion 22c of the output shaft 22.

Figure 30B:
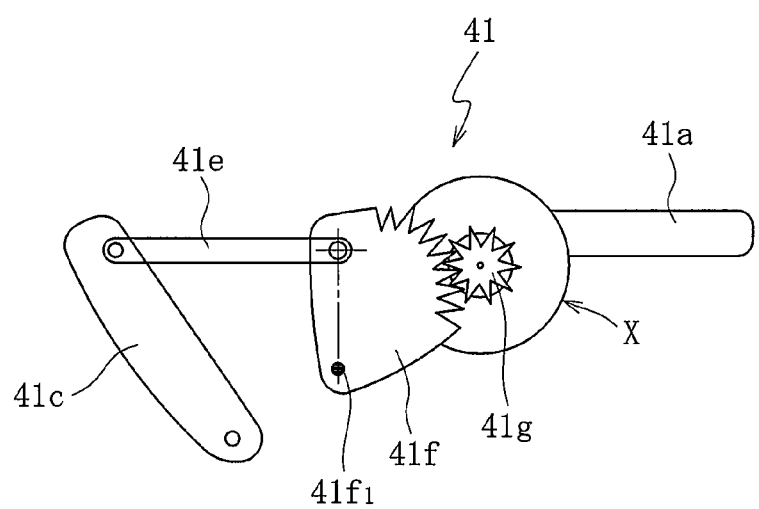
Figure 31:
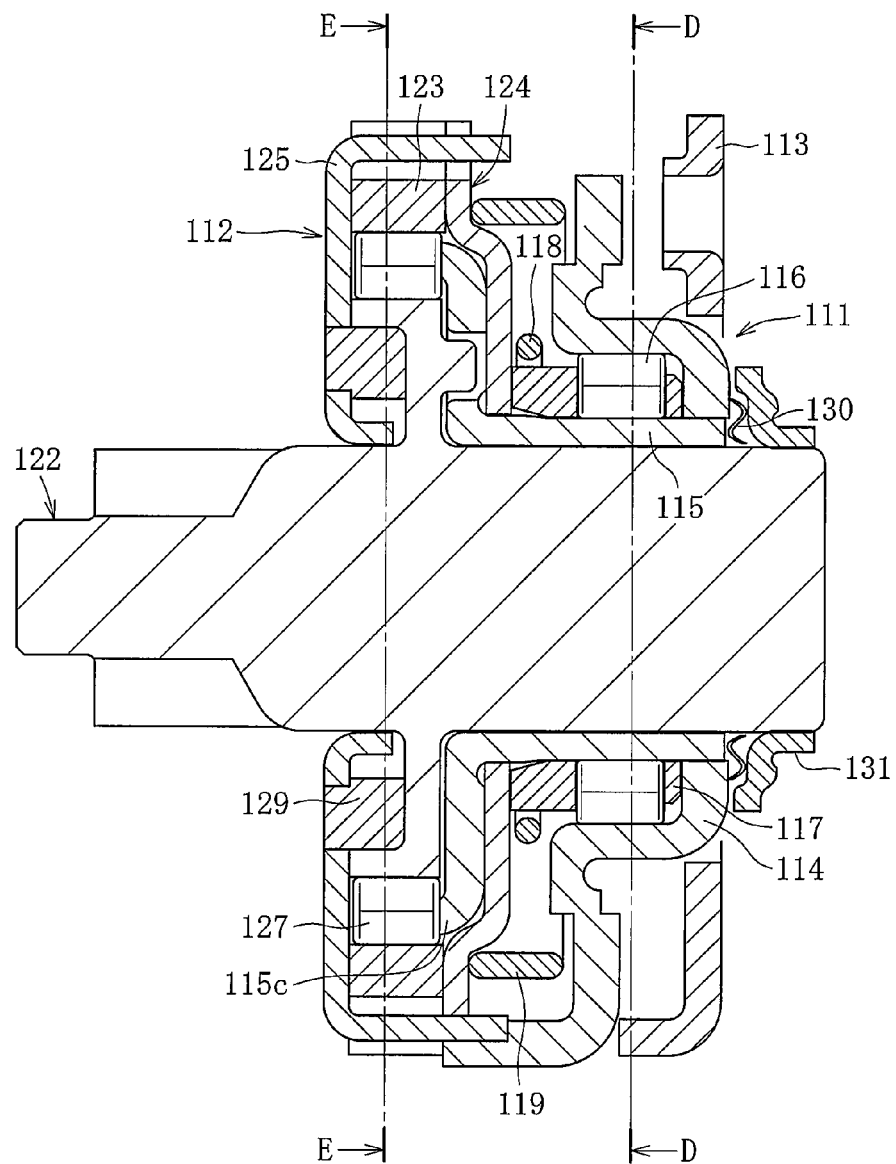
FIG. 31 is a longitudinal sectional view illustrating an overall structure of a conventional clutch unit.
Figure 32:
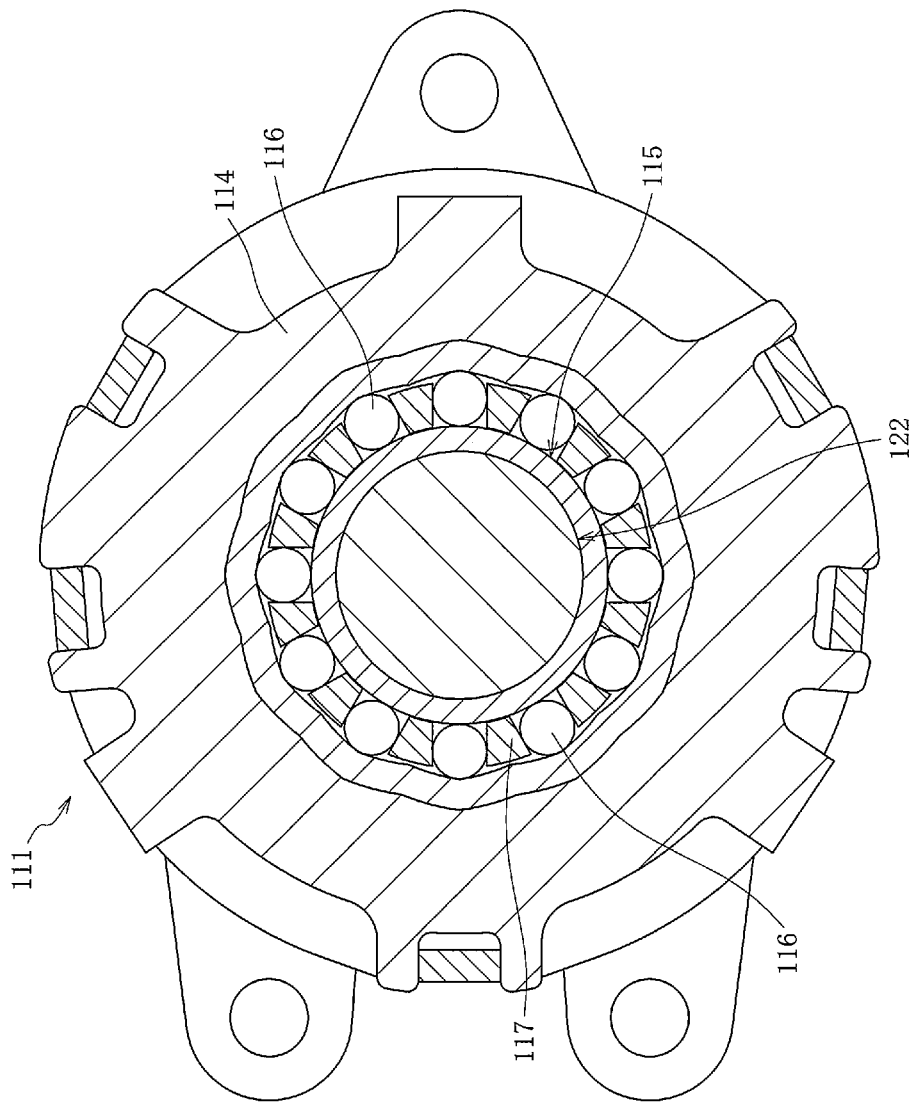
FIG. 32 is a lateral sectional view taken along the line D-D of FIG. 31.
Figure 33:
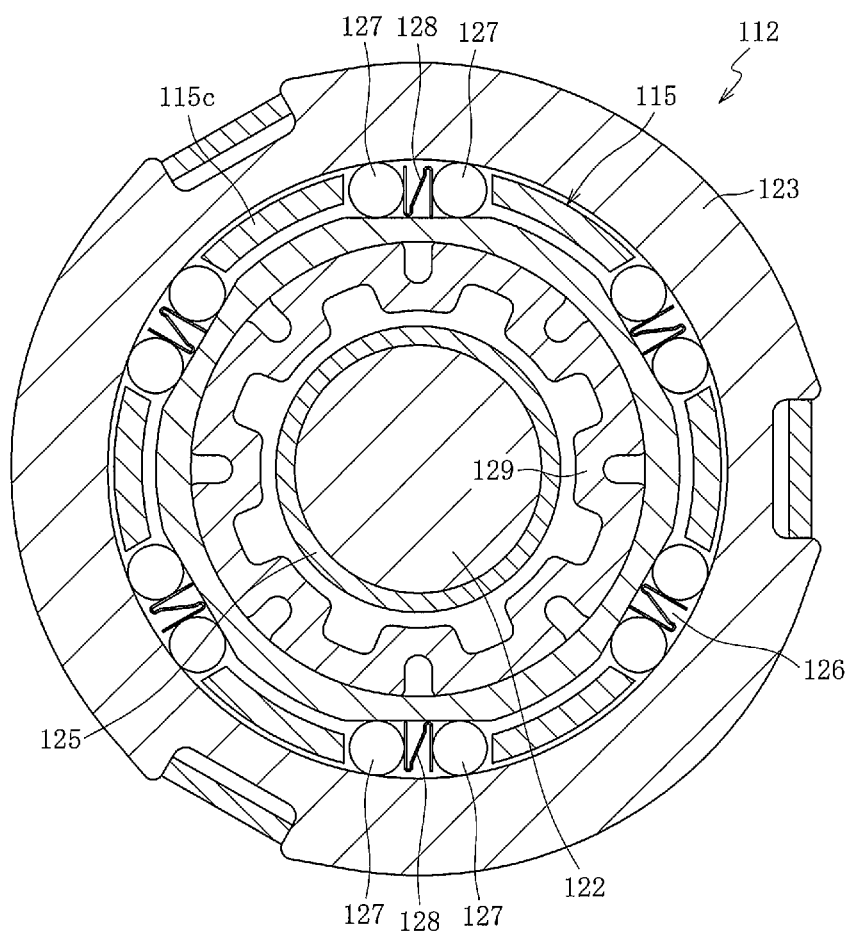
FIG. 33 is a lateral sectional view taken along the line E-E of FIG. 31.
Figure 34:
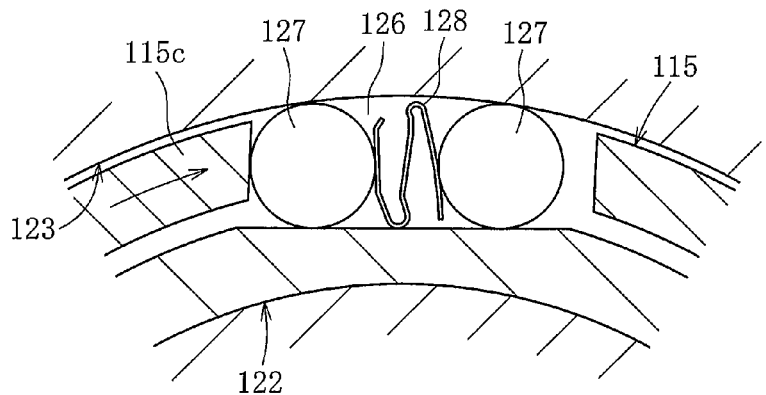
FIG. 34 is an enlarged main part sectional view illustrating the plate spring and the cylindrical rollers at the start of the operation of the brake-side clutch section.

In FIG. 30b, when the operation lever 41a is pivoted counterclockwise (upward), rotational torque input in that direction is transmitted to the pinion gear 41g through intermediation of the clutch unit X so that the pinion gear 41g pivots counterclockwise. Then, the sector gear 41f meshing with the pinion gear 41g pivots clockwise so as to pull the other end of the link member 41c through intermediation of the link member 41e. As a result, the link member 41c and the link member 41d stand together, and a seat surface of the sitting seat 40a becomes higher.

In this manner, when the operation lever 41a is released after adjustment of the height H of the sitting seat 40a, the operation lever 41a pivots clockwise with the elastic force of the two centering springs 18 and 19, and returns to the original position (restores to the neutral state). Note that, when the operation lever 41a is pivoted clockwise (downward), the seat surface of the sitting seat 40a is lowered through operation in an opposite direction as that in the case described above. Further, when the operation lever 41a is released after adjustment of the height, the operation lever 41a pivots counterclockwise and returns to the original position (restores to the neutral state).

The present invention is not limited to the above-mentioned embodiments. As a matter of course, the present invention may be further carried out in various modes without departing from the spirit of the present invention. The scope of the present invention is defined by claims, and encompasses the meaning of an equivalent of the claims and all the modifications within the claims.

The invention claimed is:

1. A clutch unit, comprising:
a lever-side clutch section provided on an input side, for controlling transmission and interruption of rotational torque to an output side through lever operation; and
a brake-side clutch section provided on the output side, for transmitting the rotational torque input from the lever-side clutch section to the output side, and for interrupting rotational torque reversely input from the output side,
wherein the brake-side clutch section comprises:
   a stationary-side member restricted in rotation;
   an output-side member from which the rotational torque is to be output;
   a plurality of pairs of engagement elements arranged in wedge gaps formed between the stationary-side member and the output-side member, for controlling the transmission of the input rotational torque and the interruption of the reversely input rotational torque through engagement and disengagement between the stationary-side member and the output-side member; and
   plate springs each inserted between each of the plurality of pairs of engagement elements, for imparting a repulsive force to the each of the plurality of pairs of engagement elements,
wherein each of the plate springs has an N-shape in cross section that comprises an intermediate oblique portion and upright portions formed by folding both ends of the intermediate oblique portion and extending both the ends of the intermediate oblique portion in opposite directions,
wherein an outside dimension between both the ends of the intermediate oblique portion is smaller than a maximum gap dimension of each of the wedge gaps formed between the stationary-side member and the output-side member, and
wherein a length dimension of each of the upright portions of each of the plate springs is larger than a separation dimension between both the ends of the intermediate oblique portion, which is a dimension determined in parallel to each of the upright portions.

2. A clutch unit according to claim 1, wherein the each of the plurality of pairs of engagement elements of the brake-side clutch section comprises a cylindrical roller.

3. A clutch unit according to claim 2, wherein a length dimension of each of the upright portions of each of the plate springs is at least ¾ of a radius of each of the plurality of pairs of engagement elements.

4. A clutch unit according to claim 3,
wherein each of the plate springs comprises folding portions having a round shape in cross section, the folding portions being formed between the intermediate oblique portion and the upright portions, and
wherein one of the folding portions is different in size from another of the folding portions.

5. A clutch unit according to claim 2,
wherein each of the plate springs comprises folding portions having a round shape in cross section, the folding portions being formed between the intermediate oblique portion and the upright portions, and
wherein one of the folding portions is different in size from another of the folding portions.

6. A clutch unit according to claim 1, wherein a length dimension of each of the upright portions of each of the plate springs is at least ¾ of a radius of each of the plurality of pairs of engagement elements.

7. A clutch unit according to claim 6,
wherein each of the plate springs comprises folding portions having a round shape in cross section, the folding portions being formed between the intermediate oblique portion and the upright portions, and
wherein one of the folding portions is different in size from another of the folding portions.

8. A clutch unit according to claim 1,
wherein each of the plate springs comprises folding portions having a round shape in cross section, the folding portions being formed between the intermediate oblique portion and the upright portions, and
wherein one of the folding portions is different in size from another of the folding portions.

9. A clutch unit according to claim 1,
wherein each of the plate springs comprises folding portions and bending portions for connecting the intermediate oblique portion to the respective folding portions, and
wherein one of the bending portions is different in curvature radius from another of the bending portions.

10. A clutch unit according to claim 1, wherein the lever-side clutch section comprises:
- an input-side member to which the rotational torque is to be input through the lever operation;
- a coupling member for transmitting the rotational torque from the input-side member to the brake-side clutch section;
- a plurality of engagement elements for controlling the transmission and the interruption of the rotational torque input from the input-side member through engagement and disengagement between the input-side member and the coupling member;
- a cage for retaining each of the plurality of engagement elements at predetermined circumferential intervals;
- a stationary-side member restricted in rotation;
- a first elastic member provided between the cage and the stationary-side member, for accumulating an elastic force due to the rotational torque input from the input-side member, and for restoring the cage to a neutral state due to the accumulated elastic force by releasing the input rotational torque; and
- a second elastic member provided between the input-side member and the stationary-side member, for accumulating an elastic force due to the rotational torque input from the input-side member, and for restoring the input-side member to a neutral state due to the accumulated elastic force by releasing the input rotational torque.

11. A clutch unit according to claim 10, wherein each of the plurality of engagement elements of the lever-side clutch section comprises a cylindrical roller.

12. A clutch unit according to claim 1, wherein the lever-side clutch section and the brake-side clutch section are incorporated in an automobile seat-lifter section.

13. A clutch unit according to claim 12,
- wherein an input-side member of the lever-side clutch section is connected to an operation lever, and
- wherein the output-side member of the brake-side clutch section is coupled to a link mechanism of the automobile seat-lifter section.

14. A clutch unit, comprising:
- a lever-side clutch section provided on an input side, for controlling transmission and interruption of rotational torque to an output side through lever operation; and
- a brake-side clutch section provided on the output side, for transmitting the rotational torque input from the lever-side clutch section to the output side, and for interrupting rotational torque reversely input from the output side, wherein the brake-side clutch section comprises:
- a stationary-side member restricted in rotation;
- an output-side member from which the rotational torque is to be output;
- a plurality of pairs of engagement elements arranged in wedge gaps formed between the stationary-side member and the output-side member, for controlling the transmission of the input rotational torque and the interruption of the reversely input rotational torque through engagement and disengagement between the stationary-side member and the output-side member; and
- plate springs each inserted between each of the plurality of pairs of engagement elements, for imparting a repulsive force to the each of the plurality of pairs of engagement elements, wherein each of the plate springs has an N-shape in cross section that comprises an intermediate oblique portion and upright portions formed by folding both ends of the intermediate oblique portion and extending both the ends of the intermediate oblique portion in opposite directions, wherein an outside dimension between both the ends of the intermediate oblique portion is smaller than a maximum gap dimension of each of the wedge gaps formed between the stationary-side member and the output-side member, wherein each of the plate springs comprises folding portions and bending portions for connecting the intermediate oblique portion to the respective folding portions, and wherein one of the bending portions is different in curvature radius from another of the bending portions.

* * * * *